(12) United States Patent
Hutchinson

(10) Patent No.: US 7,350,737 B2
(45) Date of Patent: Apr. 1, 2008

(54) ADJUSTABLE LEAD, CORD, ROPE OR SHEET STORAGE DEVICE

(76) Inventor: Vaughan John Hutchinson, 175 Surrey Road, RD 8, Tariki, Inglewood, Taranaki (NZ)

( * ) Notice: Subject to any disclaimer, the term of this patent is extended or adjusted under 35 U.S.C. 154(b) by 0 days.

(21) Appl. No.: 10/568,273

(22) PCT Filed: Aug. 16, 2004

(86) PCT No.: PCT/NZ2004/000187

§ 371 (c)(1),
(2), (4) Date: Jun. 16, 2006

(87) PCT Pub. No.: WO2005/016809

PCT Pub. Date: Feb. 24, 2005

(65) Prior Publication Data

US 2006/0278749 A1    Dec. 14, 2006

(30) Foreign Application Priority Data

Aug. 15, 2003  (NZ) ........................... 527666
Sep. 18, 2003  (NZ) ........................... 528331

(51) Int. Cl.
*B65H 75/38*    (2006.01)
(52) U.S. Cl. .................................................... 242/405
(58) Field of Classification Search ................ 242/405, 242/405.1, 405.2, 404.3, 400.1, 129, 222, 242/613.3, 591; 191/12 R, 12.2 R; D8/358, D8/360.1; D13/139.7
See application file for complete search history.

(56) References Cited

U.S. PATENT DOCUMENTS

| | | | |
|---|---|---|---|
| 2,490,279 A | * | 12/1949 | Nunamaker |
| 2,709,028 A | * | 5/1955 | Cottar |
| 4,688,739 A | * | 8/1987 | Moore |
| 4,779,815 A | | 10/1988 | Moore |
| 5,429,321 A | * | 7/1995 | Skyba |
| 6,003,803 A | * | 12/1999 | Knapp et al. |
| 6,135,381 A | | 10/2000 | Teson |

FOREIGN PATENT DOCUMENTS

| AU | 2002301862 | 2/2004 |
|---|---|---|
| DE | 2816266 | 10/1979 |

* cited by examiner

*Primary Examiner*—William A Rivera
(74) *Attorney, Agent, or Firm*—Young & Thompson

(57) ABSTRACT

A storage device (1) for storing a lead, rope, chain, solid sheet or elongate material, including a body (3) including one elongate backbone (4) and at least one elongate tine (5) interconnected thereto (12) but separated from by a defined distance to form a channel (6) adapted to receive a lead, rope, chain, solid sheet or elongate material, support elements (9) and a latch apparatus (8), the channel (6) being of a dimension to allow only one length of a lead, rope or chain to fit between the backbone (4) and tine (5) at a time (5), preventing tangling of the lead, rope or chain. The storage device (1) may be attached to a wheeled frame or stand for ease of transport.

36 Claims, 14 Drawing Sheets

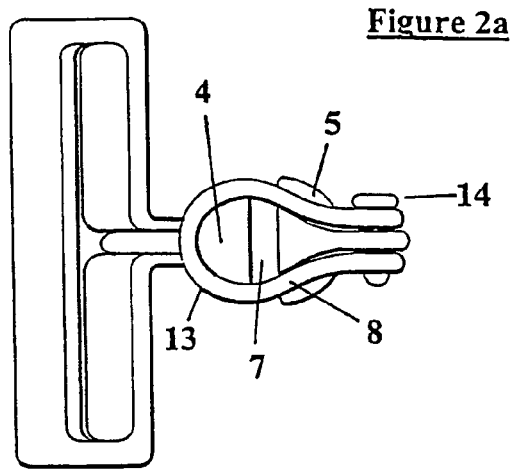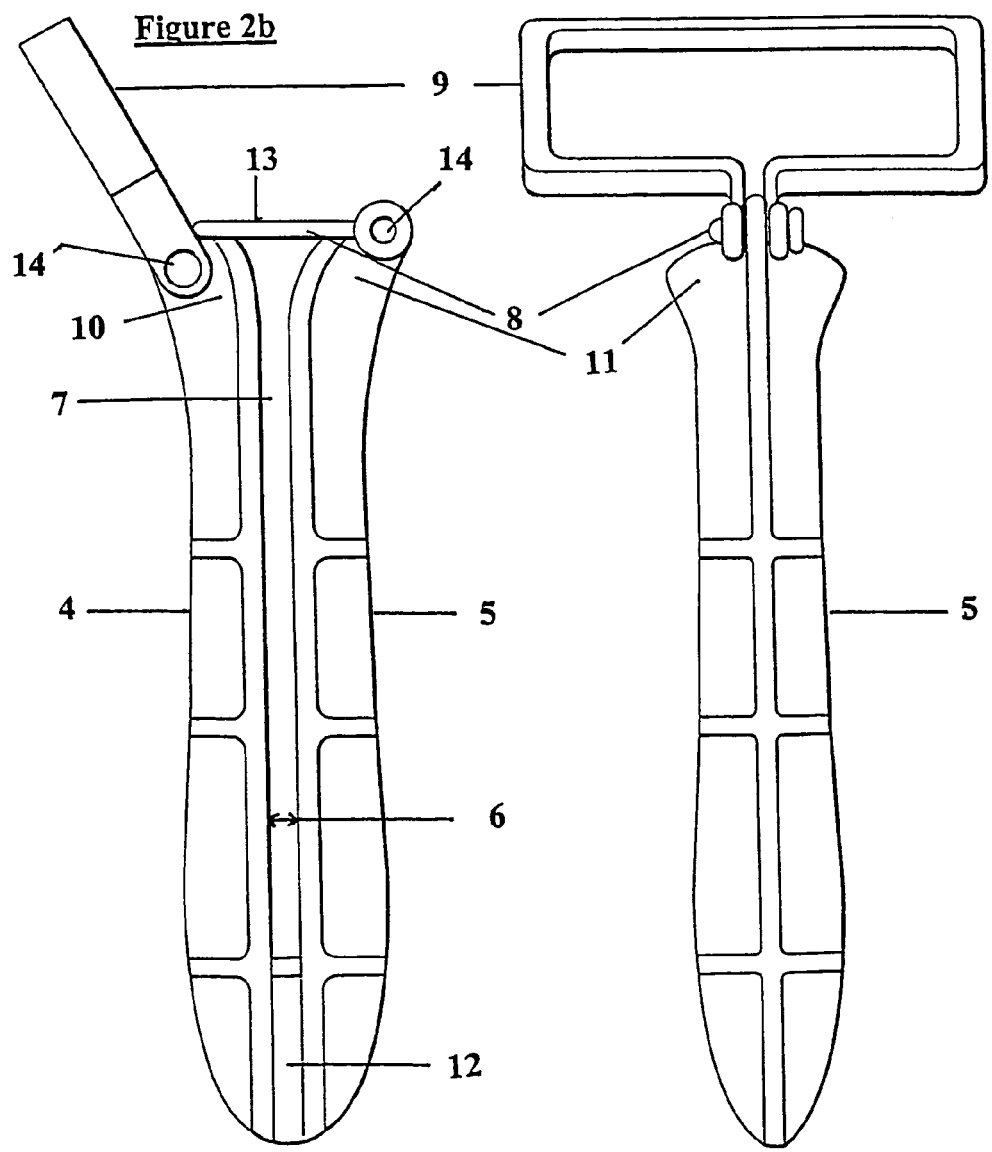

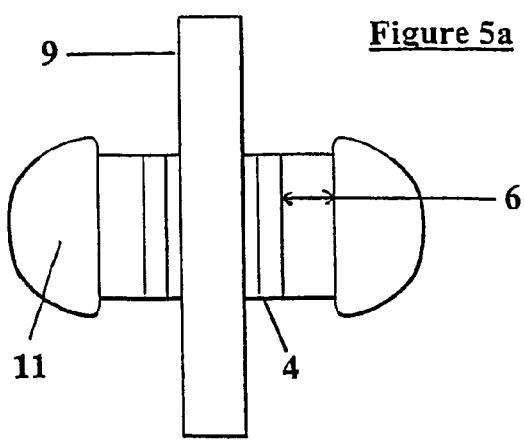
Figure 5a
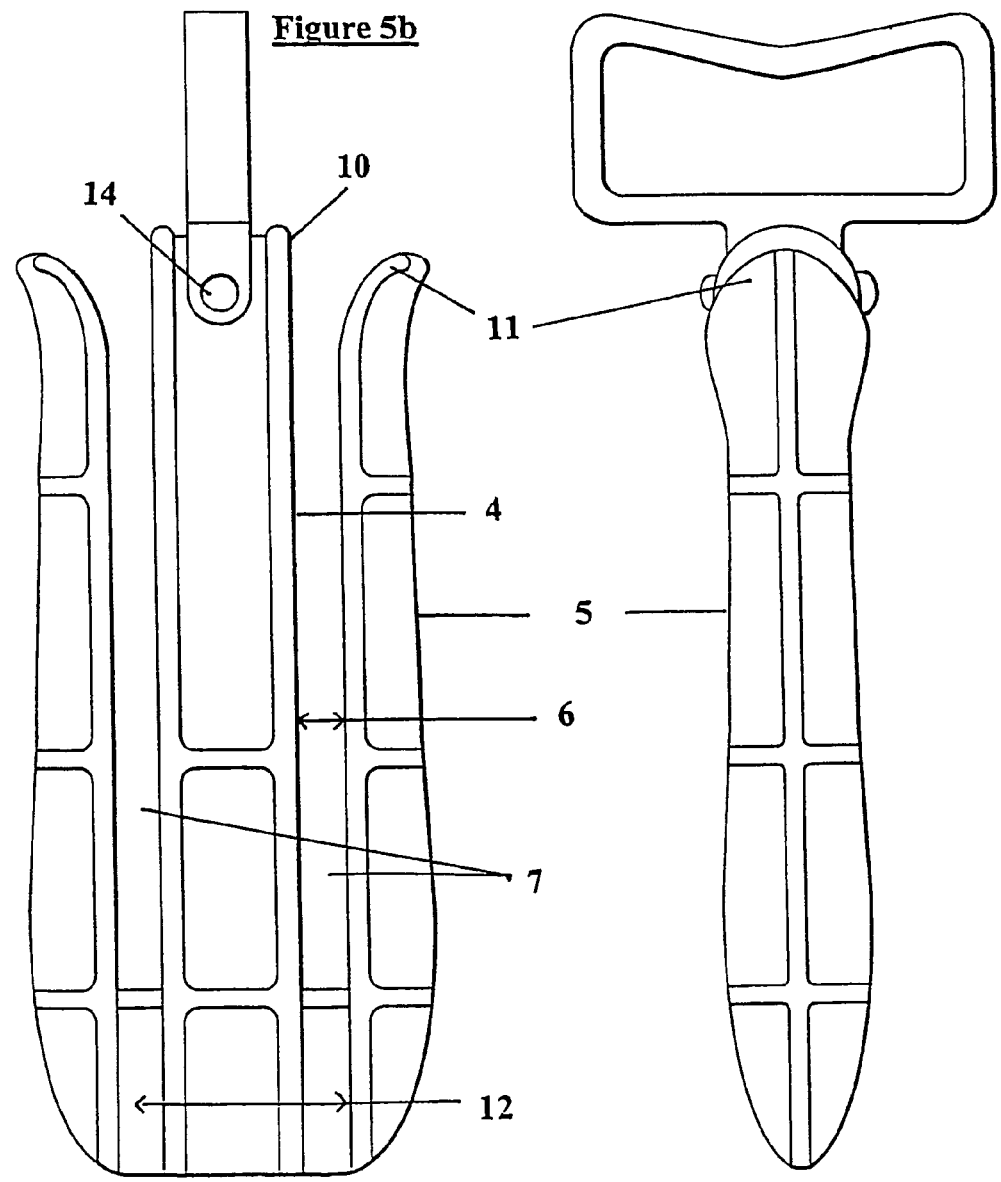
Figure 5c
Figure 5b

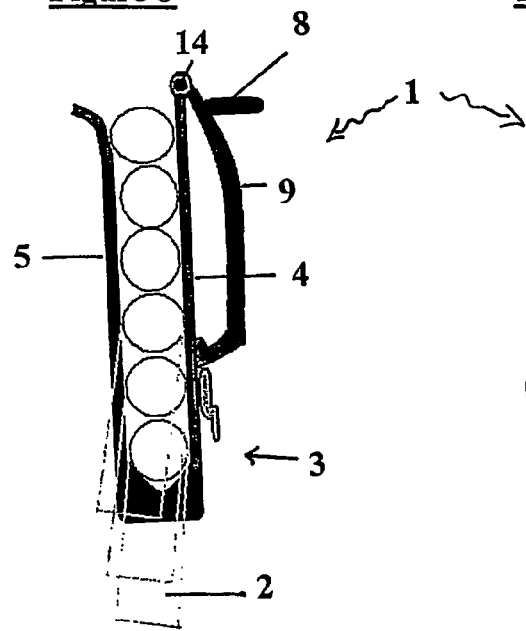
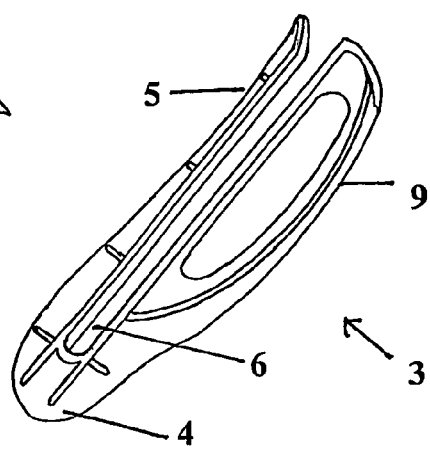
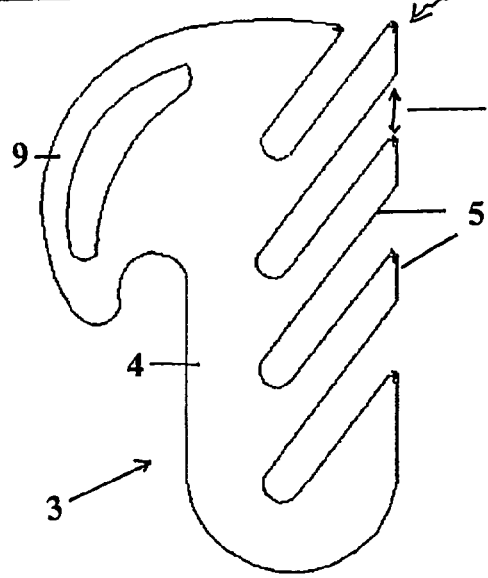
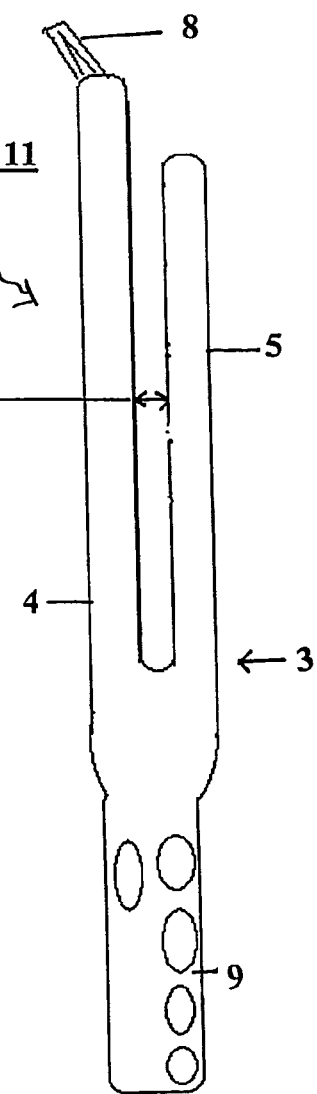
Figure 8
Figure 9
Figure 10
Figure 11

ADJUSTABLE LEAD, CORD, ROPE OR SHEET STORAGE DEVICE

TECHNICAL FIELD

The present invention is directed to improvements in and relating to storage devices.

In particular, the invention relates to aspects of the features, manufacture, operation and application of an improved storage device for the managing and storing of a range of articles, not only flex, cord, flexible tubing made of plastics material and so forth for electrical extension leads, for garden hoses, for rope, for rubber tubing, for gas hoses associated with various types of equipment, such as air hoses, hoses for welding equipment and the like, but also for use with glass, wall-boards and solid sheet materials or similar, along with other articles that may from time-to-time benefit from the use of this invention. The device may also be used not only for storage of these articles, but for transport to sites were they are required to be carried for use.

The storage device is envisaged for use to store such articles safely and neatly, yet also enables easy access to, carrying of and use of such articles as required on site. Where it is used to store leads, tubing, rope and so forth it does so in a manner that enables the leads etc. to be safely and neatly stored until use, yet enables the leads, etc. to be unwound from the device in a tangle-free manner. Where it is to be used for electrical leads, its design enables the leads to be used whilst still wound on the storage device, due to reduced effects of heating and magnetic field generation effected by the arrangement of the leads on the device.

However, it should be appreciated that this invention may have applications outside this field.

BACKGROUND ART

While the present invention has a number of potentially realisable applications, it is in relation to problems associated with existing reel, or storage systems used for electrical extension leads that the present invention was primarily developed, along with looking for a solution to address the problems associated with twisting, knotting and safety issues when using and storing electrical leads.

However, in the course of development a number of additional features and applications have evolved that contribute to the functionality of the invention and provide potentially realisable benefits over prior art systems.

For example, many systems for storing leads, cords, rope, tubing, hoses and the like may be available in a form requiring the manual carrying of the device and article from a storage site to the site for use. Where large tubing such as hoses for swimming pools and the like, or long lengths of the article are involved, the weight becomes a significant factor affecting the ease with which the device and stored article may be transported.

There are a number of trolley or wheeled systems available in the prior art, but none to the knowledge of the applicant that includes the storage feature of the present invention. Hence, similar problems of storing the leads and so forth still exist with existing systems.

Further, in some industries, organizations or institutions, such as hospitals, there are strict requirements in the use of articles and the functions they perform in a manner that does not interfere with any other operational system in the vicinity. For example, in operating theatres, it is important to ensure magnetic fields are minimised to limit interference with sensitive technology used in close vicinity when performing operations. Operating theatres use many pieces of machinery where electrical leads are required to be kept off the ground, and whilst the present invention primarily addressed that, it is in added feature of the configuration of the storage device that has ancilliary benefits over the prior art.

Further, the range of applications of the present invention provides more versatility for use in a range of applications, from storing and facilitating use of electric leads in work areas, to the transport, storage and improved use of swimming pool hoses, to the use on boats for storage and improved use of ropes for tying the boat to a dock or for anchors. Presently, the most common behaviour is to loop the cords or hoses on the ground or deck of the boat, which risks them becoming tangled, knotted or damaged.

In yet another application, the present invention may be used to carry or store various thicknesses of wall-boards, such as plasterboard, wall boards of various forms, corrugated iron, plywood sheets and the like. Presently these types of articles are carried by extending the arms wide enough to reach each edge of the narrowest width of the board, or may use hooks or similar. These various systems may be time and energy consuming, may be difficult to enable the individuals to easy perform the transportation and may be difficult to control in the event of a windy day.

In relation to prior art systems, a reel, or spool, is one of the most basic means of storing hoses, flexes, electrical extension cords, tubing, rope and so forth. A reel is a mechanical object, or frame, which is typically circular, or cylindrical, turns on an axis and on to which a cord, lead, hose, or flex and so forth is wound. The design of the reel may vary depending on the cord, flex, or hose with which it is used and the particular requirements of the hose, flex, or cord. Most noticeably however, is that most reels operate in use in a rotatable manner. As the body of the reel rotates, so is the cord, flex or hose wound on, or off, the reel. Some reels may be fixed, but these are less practical where substantially long lengths of hose, flex, or cord are required to be wound on, or off, the reel.

A reel is typically designed to include a central, horizontal cylinder, at each distal end of which are vertical faces, typically circular and substantially perpendicular to the central axis of the cylinder. The cylinder defines the width of the reel, whilst the end faces define the height to which a cord, or similar, may be wound on to the reel.

Accordingly, as a cord, hose, or lead is wound on to a reel, the cord will rotate around the central cylinder with each successive loop being horizontally and/or vertically adjacent to previous loops. Where electrical extension leads, or flexes, are to be used, it is important to fully unwind the lead from the reel to minimize the likelihood of electrical resistance of the due to the electrical current causing overheating of the lead where it is in close contact with, or overlapping, adjacent sections of lead. Overheating due to such coil effect may result in damage to and/or failure of the insulating sheath of the electrical lead. This is potentially hazardous to the user.

When the cord, hose, or lead is unwound from the reel the period of storage and the material from which the cord, lead, or hose is made, will dictate whether the unwound cord retains a predisposition to a circular orientation. This predisposition to curl into a circular orientation after the flex, cord, or hose is unwound, can be frustrating where a straight extension of the cord, flex, or hose is required. Further, where hoses are concerned, attempts to stretch the hose out to straighten it invariably leads to kinks. These above described situations prove frustrating and are recognised disadvantages of prior art reel systems.

A further disadvantage is that the reel with, or without, the hose, lead, or cord is a bulky device that is not easily, nor conveniently stored. The problem is exacerbated where the reel includes a protruding handle used to turn the reel to wind the hose, cord, or lead on to the reel drum.

Yet another disadvantage relates to the fact that such reels typically via their actual design and mode of operation, include moving parts. The potential for wear, damage and breakdown exists and may be greater where the reel is frequently used.

Yet another way that flexes, cords and hoses may be stored is by the user manually looping the flex, cord, or hose, (such as in the user's hand, or on the ground) and then gathering the loops together. The looped flex, cord, or hose may then be simply dropped on the ground, or hung from a hook, nail, or the like. The user may choose to use a tie to keep the loops together, or may just simply leave the looped flex, cord or hose unrestrained. The potential exists however, for the hose, lead, or cord to be damaged through being dragged across the ground, squashed through being stood on, or driven over. The means of storage may also result in damage to the flex, cord, or hose. For example, a lead or hose may be spilt due to the angle of the bend created in the hose, flex, or cord when suspended from a hook, nail, or the like. Where the flex is an electrical extension lead, the potential for damage to the lead becomes a safety hazard.

Further, a common occurrence with subsequent use of the flex, cord, or hose is that as the loops are unwound from one another, the flex, cord, or hose may become twisted, or knotted, making the process of unwinding the flex, cord, or hose, difficult, time consuming and frustrating.

Electrical extension leads are commonly used in multiple situations. Such uses include domestic use around the home and garden and in workshops, sheds, or garages; commercial use in trades such as building, plumbing, electrical installations and repairs; industrial use in factories, machine shops and so forth; uses at recreational events, such as outdoor parties, sporting events, craft work, musical events; and uses in service industries, such as in hospitals where there is a huge range of situations where equipment includes long leads, hoses, tubes and the like and where safety and hygiene are of paramount importance. Additionally, extension leads may be used for a range of other types of technical equipment, and including filming, or lighting, scenarios for example. In some applications, multiple extension leads may be used. Having a simple system for storing, transportation and for improving ease of accessibility and use of cords, hoses and particularly electrical leads, would benefit the user in terms of time, effort, safety, cost, well-being and so forth.

However, whilst the range of configurations to effect the different uses may vary, the overriding feature of the present invention remains substantially the same.

It would be useful therefore, to have a storage device that:
a) Could have the benefits of being adapted to store a range of articles; including, but not limited to cords, flexes, tubes, leads, ropes, chains or hoses of varyingly length; yet
b) Could be easy to operate, transport, or store in accordance with the requirements of a particular situation and requiring minimum time and physical requirements on the part of the user; and
c) Could be used to store articles in a manner that, when required to be used, removal from the device may be accomplished easily and potentially more efficiently than may be common to prior art system; and in particular, when used to store cords, flexes, hoses, tubes, ropes, chain or leads could be achieved in a manner that, when required to be used, removal from the device may be accomplished without a resulting tangled mess common to prior art system; and
d) Could potentially minimise damage to the integrity of the article; and
e) Offered a safe alternative to the storage and use of an article; and
f) Could provide additional benefits by enabling an article such as an electrical extension cord to be stored on the device and still be used without effecting damaging coil effect or without effecting the extent of magnetic fields that may interfere with the operation of adjacent or nearby equipment; and
g) Could be carried around, or permanently or temporarily affixed to a support bracket on a surface for storage.

It would therefore be advantageous to have an invention that offered at least some if not all of the advantages of the above proposed system. It is therefore an object of the present invention to consider the above problems and provide at least one solution which addresses a plurality of these problems.

Ideally the present invention will continue to provide a storage device system which allows for the substantially trouble free storage of hoses, flexes and cords of various tools, or machines in association with the machine, or tool itself, but having some, if not all, of the advantages outlined above.

Ideally the storage device system is suitable for use, or is suitable to being adapted for use, in any situation where hoses, cords, flexes, tubes and leads are currently employed. It is therefore a further object of the present invention to at least provide the public with a useful choice, or alternative system.

Further aspects and advantages of the present invention will become apparent from the ensuing description which is given by way of example only. It should be appreciated that variations to the described embodiments are possible and would fall within the scope of the present invention.

DISCLOSURE OF INVENTION

Whilst the present invention has been and is still described with particular reference to the features and use of a storage device for electrical extension leads, it should be appreciated that the invention may also be applicable to and/or be adapted for use with, a range of other leads, hoses, flexes and cords, or other elongate pieces of material capable of being flexible enough to be otherwise wound up.

Further the invention may have a number of ancilliary uses for the storage and/or carrying and/or use of other articles that may benefit from the device. As mentioned in the previous section, wall-boards, roofing materials, sheet materials, and so forth may be transported, or stored using the present invention.

For the purposes of this specification the term lead shall be used to describe and refer to electric cords and electrical extension leads, in particular. However, for conciseness, it should be appreciated that the term also includes, other cords, hoses for fluids and/or flowable products, flexes, tubes and so forth made of varying materials having appropriate flexibility to enable said cords, hoses, flexes and leads to be used in conjunction with the storage device. Accordingly, where hoses are used, the hose may carry water, oils, chemicals, gases, and so forth. The electrical leads may be extension cords, light cords, power cords for various range of equipment, telecommunication leads, and so forth. Cords may also include rope for boating and the like. Chain systems may also be included.

Whilst leads, cords, chains and so forth may substantially cylindrical-shaped structures, or substantially flattened versions, other articles may take quite different shapes, as can be appreciated when considering solid sheet material such as wall-boards and the like or roofing, sunshade or screen materials. Therefore the examples used in the present application should not be seen to limit the application of the present invention only to embodiments with relevance to the present description.

According to one aspect of the present invention, there is provided a storage device for use with at least one article, said storage device including a body, said body including a substantially elongate backbone and at least one substantially elongate tine interconnected thereto in a substantially parallel arrangement, but separated there from by a defined distance to form a channel adapted to receive the article therein, and including supporting means and optionally including latching apparatus to maintain the defined distance between the backbone and the tine during storage of a article by the storage device.

According to another aspect of the present invention, there is provided a storage device for use with at least one article, substantially as described above wherein the article may include a lead, cord, rope, chain, solid sheet or elongate material.

According to another aspect of the present invention there is provided a storage device for storing at least one article substantially as described above wherein the storage device may be used to effect one or more of to store, carry or use the article within or relative to the storage device.

According to one aspect of the present invention, there is provided a storage device for use with at least one article substantially as described above wherein the channel is substantially uniform along its length.

According to one aspect of the present invention, there is provided a storage device for use with at least one article substantially as described above wherein the channel is substantially U-shaped.

According to one aspect of the present invention, there is provided a storage device for use with at least one article substantially as described above wherein the channel is substantially divergent along its length.

According to another aspect of the present invention there is provided a storage device for storing at least one article substantially as described above wherein the supporting means of said storage device includes at least one of a handle, bracket, frame.

According to another aspect of the present invention there is provided a storage device for storing at least one article substantially as described above wherein the elongate backbone and the tine of the body both include a free top distal end, whilst the bottom distal end provides an interconnecting portion to form the substantially uniformly dimensioned channel.

According to another aspect of the present invention there is provided a storage device for storing at least one article substantially as described above wherein the channel is substantially U-shaped.

According to another aspect of the present invention there is provided a storage device for storing at least one article substantially as described above wherein the width of the substantially U-shaped channel formed between the backbone and the tine is defined by the diameter, or width, of at least one article to be stored in the device.

According to another aspect of the present invention there is provided a storage device for storing at least one article substantially as described above wherein the width of the substantially U-shaped channel formed between the backbone and the tine is determined to enable only one width of the article to be fed down the channel at any one time.

According to another aspect of the present invention there is provided a storage device for storing at least one article substantially as described above wherein where the article is a lead, subsequent looping of the lead enables further widths of the lead to be fed down the channel such that, with each subsequent loop, the section of lead within the channel sits substantially atop an adjacent previous looped section of the lead.

According to another aspect of the present invention there is provided a storage device for storing articles substantially as described above wherein the latching apparatus is attached towards the top distal end of either the backbone, or the tine.

According to another aspect of the present invention there is provided a storage device for storing articles substantially as described above wherein where the latching apparatus is attached towards the top distal end of the backbone, a portion of the latching apparatus is capable of looping over the top distal end of the tine, or vice versa.

According to another aspect of the present invention there is provided a storage device for storing at least one article substantially as described above wherein the latching apparatus contributes to maintaining the defined distance between the backbone and the tine during storage of the article by the storage device, via preventing the weight of the article stored within the channel from forcing the backbone and the tine to splay apart from each other.

According to another aspect of the present invention there is provided a storage device for storing at least one article substantially as described above wherein the latching apparatus may be used as, or adapted to include, a handle for gripping the storage device in use, or for hanging the storage device when being stored.

According to another aspect of the present invention there is provided a storage device for storing at least one article substantially as described above wherein the handle operates as the latching apparatus.

According to another aspect of the present invention there is provided a storage device for storing at least one article substantially as described above wherein either, or both, the latching apparatus and the handle are pivotable with respect to the backbone, or the tine.

According to another aspect of the present invention there is provided a storage device for storing at least one article substantially as described above wherein the backbone and attached tine is able to rotate up to 360° relative to means associated with either or both a centrally located pin through the longitudinal body of the backbone, or via a rotating means associated with the latching means or handle when attached to the backbone.

According to another aspect of the present invention there is provided a storage device substantially as described above wherein additional tines may be included relative to all faces of the backbone, where leads of increased length are required to be stored and can not be accommodated within the channel of a single tine version of the storage device.

According to another aspect of the present invention there is provided a storage device substantially as described above wherein the additional tines may be attached removably or permanently.

According to another aspect of the present invention there is provided a storage device substantially as described above wherein additional tines may be included relative to all faces of the backbone, where leads of increased length are required to be stored and can not be accommodated within the channel of a single tine version of the storage device.

According to another aspect of the present invention there is provided a storage device substantially as described above wherein the tine(s) may be pivotally attached to the backbone to enable fast release and feeding out of the lead from the storage device.

According to another aspect of the present invention there is provided a storage device substantially as described above wherein additional backbones may be included from which at least one tine may extend.

According to another aspect of the present invention there is provided a storage device substantially as described above wherein the storage device may be configured to include, or be adapted to receive optional motive means to facilitate transport of the storage device and included article to and from an area for use.

According to another aspect of the present invention, there is provided a method of manufacturing a storage device for storing at least one article, said storage device including a body, said body including a substantially elongate backbone and at least one substantially elongate tine interconnected to said backbone, but separated therefrom by a defined distance to form a channel, and optionally including at least one of latching apparatus to maintain the defined distance between the backbone and the tine during storage of the article by the storage device, a handle, motive means.

According to another aspect of the present invention, there is provided a method of varying the article storage capacity of a storage device for storing either or both articles such as leads and articles such as substantially solid sheet materials and the like, said storage device including a body, said body including a substantially elongate backbone and multiple substantially elongate tines interconnected to said backbone, but each tine separated from the backbone by a defined distance to each form a channel, said tines being further separated from each other by a defined distance, and said storage device optionally including at least one of latching apparatus to maintain the defined distance between the backbone and a tine during storage of a lead by the storage device, a handle, motive means.

In one preferred embodiment of the present invention, the storage device is designed to store a single lead. Preferably the body of the storage device is designed to complement the type and length of the lead required to be stored thereon.

However, the storage device may be used for the storage and or transportation of sheet materials, such as glass, wall-boards, roofing materials and the like.

Accordingly, the length of the backbone and the length of the tine is determined to accommodate a preferred number of loops of the lead stacked sequentially on top of each other as the lead is looped on to the storage device, or to provide preferred support to the sheet material as determined by the height it extends.

The stacking effect of the lead loops one on top of the other is determined by the width of the channel created between the spaced apart backbone and tine of the body of the device. In some preferred embodiments, the channel is substantially U-shaped The width of the U-shaped channel is, in turn, determined by the width, or diameter, of the lead to be stored on the device.

Where the storage device is to be used with other articles, the base of the channel may be substantially a concave U-shape, squared off, be convex, or be tapered. In yet other embodiments the interior channel walls may be configured to complement characteristics of the article for more secure storage. For example, the interior walls of the channel may be undulating, with each indented portion configured to the diameter of an electrical cord, such that one loop of the cord is retained in the appropriate indentation. Alternatively, the channel may be configured to receive an internal sleeve having a specific configuration, which then adapts the storage device to a particular need.

As previously mentioned, a common occurrence with the use of a stored lead is that as the loops of the lead are unwound the lead may become twisted or knotted, making the process of unwinding the lead difficult, time consuming and frustrating. Further, the period of storage and the material from which the lead is made, will dictate whether the unwound chord retains a predisposition to a circular orientation. This predisposition to curl into a circular orientation after the lead is unwound, can be frustrating where a straight extension of the lead is required. These above described situations prove frustrating and are recognised disadvantages of prior art lead storage systems.

The means of storage may also result in damage to the flex, chord or hose. Where the flex is an electrical extension lead, the potential for damage to the lead becomes a safety hazard.

Accordingly, as a lead is wound on to a reel, the chord will rotate around the central cylindrical drum-shape of the reel with each successive loop being horizontally and/or vertically adjacent to previous loops. A number of sections of lead are therefore often very closely wound and often relatively tightly wound.

Where electrical extension leads are to be used, it is often recommended that it is important to fully unwind the lead from reels or other similar prior art systems to minimize the likelihood of electrical resistance due to the electrical current passing through the lead causing overheating of the lead where it is in close contact with, or overlapping adjacent sections of lead. Overheating due to such coil effect may result in damage and/or failure of the insulating sheath of the electrical lead. This is potentially hazardous to the user.

While the present invention has a number of potentially realisable applications, it is in relation to problems associated with existing reel, or storage systems, used for electrical extension leads that the present invention was developed. More specifically, it was with the problems associated with twisting, knotting and safety issues when using and storing electrical leads, that the present invention was developed.

Accordingly therefore, the electrical lead stored on the storage device of the present invention is preferably loosely looped and each successive loop is only touching a portion of a loop of the lead directly above and/or below it.

To achieve this preferred orientation of the lead on the storage device, the body of the storage device preferably includes a substantially elongate backbone and at least one substantially elongate tine of comparable length, interconnected thereto in a substantially parallel arrangement.

Further as an adjunct to the overheating aspect, the coil effect also increases the magnetic field generated around the lead. This may be disadvantageous in situations where sensitive equipment is being used and where the coil effect contributes to magnetic interference in the operation of that equipment. The present invention is so designed that the consecutive loops are stacked one on top of the other, thereby minimizing the coil effect and hence the magnetic field effect possible when leads are simply wound on drum systems.

In order to effect the preferred configuration of the storage device, the elongate backbone and the tine of the body both include a free top distal end, whilst the bottom distal end of each is interconnected to form the channel. The interconnecting portion of the body defines the width of the channel at the bottom of the channel, such that the channel complements the width/diameter of the lead.

It should be appreciated that the present invention lends itself to use of more than one tine with one or more central backbones. The number and arrangement of the tines relative to one or more central backbone(s) will thus determine desired variability in the length of lead able to be stored on the storage device, or the number of separate leads able to be stored. Where additional tines are included, the additional tines are arranged relative to the central backbone(s) so as to create a relatively seamless extension to the storage capacity of the overall combined structure.

In one preferred embodiment of the present invention this may be achieved by the inclusion of two tines located on opposite sides of the central backbone, but all being aligned in the same plane. In yet other embodiments, the storage device may be configured to have the tines set to protrude from the central backbone with a defined angle of up to 90 degrees between the adjacent tines. Irrespective of the arrangement and number of tines, the combined effect is to provide a substantially seamless extension to the storage capacity of the storage device.

The storage device may also be configured to take any appropriate shape as required to effect the preferred strength to support the weight of the lead. However, of critical importance is the defined distance of the channel created between the backbone and the tine. Depending on the dimensions of the article stored on the storage device, the width of the channel may vary from one embodiment to another. However, it is important that the channel be substantially the same defined width for a substantial length of the lower portion of the channel receiving the article.

Therefore, whilst in many embodiments of the present invention the configuration of the storage device includes the at least one elongate backbone and the at least one tine of the body which both include a free top distal end, whilst the bottom distal end of each is interconnected to form the appropriately configured channel, such that the channel complements the width/diameter of the article, in other embodiments the interconnecting portion may form part of either the backbone or the tine and include therewith a pivoting means to enable the tine to pivot up to 180° through a vertical plane. Thus the tine may be operated from a position substantially parallel to the backbone, through a range of angular positions to at most a position substantially aligned to the longitudinal axis of the backbone.

This latter embodiment may have application where the fast release of the article is required. For example, this embodiment may be useful for the release and unwinding of an anchor rope, or similar.

Accordingly, for example, the latching means may be released which allows the tine to pivot downwards under gravity to release the article previously retained in the channel between the tine and the backbone. Alternatively, the pivoting tine may benefit the inputting of a solid sheet material into the channel in preparation for transportation or storage. In such embodiments, a different latching means may be employed to retain the tine in its storage position parallel to the backbone.

It should also be appreciated that in some embodiments of the present invention it would be advantageous to have a rotating system of the central backbone and associated tine(s). For example, a rotating system may assist in the loading or unloading of a lead onto and off the storage device, particularly where multiple tines are included and the lead is substantially long. The rotating means may enable the backbone to rotate up to 360° or more, may enable the backbone to rotate from side to side through a 180° or 90° arc, or any horizontally displaced angle.

The arrangement of the rotating means may vary between embodiments. For example, the backbone may be substantially hollow and be capable of receiving an elongate pin or such like around which the backbone can rotate. Alternatively the connection of the latching apparatus and/or the handle may include rotating means. Thus when the latching means is released the central backbone may be rotated, but when the latching means is secured the backbone is not rotatable. As can be appreciated various options may be used with or adapted for use with the present invention to effect the desired operation.

In embodiments of the present invention where there are two or more tines the tines may be permanently or removeably attached to the central backbone. Removeable tines may be attached via a tight push fit, via bayonet type fitting, via a slot and slide system, via a clip-on system, or any other suitable means. Accordingly the storage device becomes much more versatile in the range of applications of it, and with a variety of articles.

The storage device may also be configured to take any appropriate shape as required to effect the preferred strength to support the weight of the article. However, of critical importance is the defined distance of the channel created between the backbone and the tine. The dimensions of the width of the channel may vary from one embodiment to another. However, it is important that for many embodiments the channel be the same defined width for the substantial length of the channel receiving the article(s). Nevertheless, it is conceivable that in some situations and with some articles it may be necessary for the channel to be tapered, or diverge towards its upper or lower end.

To contribute to maintaining the preferred shape of the storage device when loaded with a lead, latching apparatus may be used. The latching apparatus also serves to secure the lead on the storage device and minimises the likelihood of the lead unwinding from the storage device.

The latching apparatus is preferably pivotally attached to a portion of the body of the storage device and is able to operate between a latched and an unlatched position. When in an unlatched position the lead may be fed onto the storage device. When in the latched position removal of the lead is limited, or the lead and device are ready to be stored away.

In preferred embodiments of the present invention, the latching apparatus is substantially looped-shape, so as to be able to pass over the top of the central backbone, or the tine, as required. The dimensions of the loop of the latching apparatus are preferably defined to both accommodate the width of the backbone, or tine, as relevant, yet also include allowance for the width of the channel. When the latch is pivoted closed the latch serves to minimise the likelihood of the tine and backbone splaying apart under the weight or pressure of the lead within the storage channel.

Whilst in some preferred embodiments the latching apparatus may contribute to maintaining the preferred shape of the storage device when loaded with a lead, in other embodiments the article stored by the storage device may mean that the latching apparatus is most useful as a handle or as a means to hang the storage device from a hook means or similar for storage or during use. Use of the latching means as a handle is most likely to be the case where the storage device is used with solid sheet materials or similar articles.

The latching apparatus is accordingly therefore, preferably pivotally attached to a portion of the body of the storage device and is able to operate between a latched and an unlatched position. In order to enable the latching apparatus to pivot, the latching apparatus includes at least one aperture capable of alignment with a complementary aperture on a tine, or on the backbone. A pivoting means, such as a pin and spring clip, a cotter pin, a rivet, a nut and bolt arrangement, or comparable available means may be used. Thus when the pivoting means is engaged with in-line apertures, the latching means is fitted to the body of the storage device. It may be relevant in some embodiments to also include a locking means to effect retention of the latching means (or even a handle) in a preferred arrangement—whether it be in the unlatched or latched position, to prevent movement of the latching apparatus until required.

It is important to effect firm interconnection which allows appropriate pivoting, but not so much as to enable sloppy movement of the latching apparatus relative to the backbone, or tine, which may negatively impact on the appropriate latching required, as well as resulting in wear around the internal surface of the apertures which may necessitate replacement of the latching apparatus, or pivoting means.

Whilst one latching apparatus has been described in relation to the present invention, it should be appreciated that any other suitable latching apparatus, or a combination of latching and/or handle means may be employed, or adapted for use, with the storage device.

The same affixing, pivoting and operational description is also relevant to the storage device in the instance where an embodiment also, or instead, includes either or both a handle and a bracket as supporting means. Where embodiments do include a specifically designated handle, the handle enables the storage device to be gripped to loop a lead on, or off, the device, enables the device to be carried to locations where the lead is required to be used and also provides a means to hang the storage device up for storage of either or both the storage device and the lead. The bracket enables the storage device to be mounted on a wall, post or other support surface and the lead fed out from that point. Of advantage in having brackets as the supporting means is the opportunity to have a number of brackets placed at various locations and be able to carry the storage device to the preferred location, attach it to the bracket and have free hands to hold the lead and so forth.

Where the supporting means is a handle, the handle of some embodiments may include specifically designed finger grooves to improve the comfort of gripping the handle.

The description of the present storage device has been limited so far to the use of a storage device with a backbone and tine of fixed length. In some embodiments, where lighter leads may be required to be stored, increased capacity of storage may be effected with a body in which for example the backbone is substantially longer than the tine, but the tine may be telescopically extended to increase its length to that of the length of the backbone. Such an extension would only be employed as required, but this embodiment provides the flexibility and adjustability to accommodate varying lengths of leads that would otherwise be accommodated by a storage device having multiple tines. Preferably such telescopic adjustments would be made incrementally and with relative ease.

Alternatively, extension sleeves may be added to the tine to provide the desired adjustability. Preferably, such adjustment would not be time intensive, would not require complex additional pieces of machinery, specialist knowledge, or tools and would offer an effective adjustment means.

Preferred embodiments of the present invention are manufactured from plastics materials using moulds. However, other methods of construction and varying materials may be used. For example, the device may be made from stainless steel, glass reinforced plastics and so forth.

The choice of materials is primarily dictated by their strength, durability and in some cases an emphasis may be on weather-resistance, or the ability to sterilise the device for purposes such as use in hospitals and other sterile environments. The cost of the various materials is also a consideration, but where the device is used in specialised areas, it may be necessary to produce high quality, sterile, stainless steel versions, irrespective of cost.

The devices may be manufactured via any appropriate means, including being injection moulded, rotamoulded, welded, or cast. The choice of manufacturing options is dependent on the materials used, the final designated use of the device and the ease of production.

As can be appreciated from the above description, the feature of the adjustments to the storage device obtained through the numerous alternative positions of more than one tine relative to the central backbone(s) of the present invention and the option to extend the length of the tines, provides an advantage over prior art systems which usually have a fixed capacity.

The storage device also potentially therefore provides the benefits of being adapted to store chords, flexes, leads, tubes, or hoses of varyingly length, or varying numbers of separate leads.

In addition, the storage device is easy to operate, transport, or store and requires minimum time and physical requirements on the part of the user.

The storage device also provides a system whereby stored chords, flexes, hoses or leads are stored in a manner that, when required to be used, are removed from the device without a resulting tangled mess common to prior art system, as a result of the lead being sequentially stacked one loop at a time on top of the adjacent loop below it. Accordingly as the lead is unlooped, it does not have the opportunity to become tangled up with other loops on the storage device.

As far as safety issues are concerned the present invention potentially minimise damage to the integrity of the hose, lead, flex, tube, or chord as the lead is easy to hang up on the storage device and so is not left on the ground where it may be damaged. Further, the likelihood of electrical resistance causing overheating of an electrical lead and potentially damaging the insulation of the lead, may be minimised should a person use the lead whilst still partially wound on the storage device. The present invention does not advocate the general use of coiled extension leads. However, in the present invention the manner in which the lead is looped on the device, means there are fewer adjacent loops in close proximity, so the potential for electrical resistance and the ensuing coil effect may be reduced. Accordingly, where the lead is used whilst still wound on the device, the issue of safety to the user is less problematic than when coiled extension leads are used whilst retained on typical prior art reel-type devices. Nevertheless, the user is required to practice safe use of the device and ensure that the loops of the lead, when stored on the device, are not so tightly wound as to create the potential for the coil effect to occur.

Finally, the present invention offers a safe alternative to the storage and use of electrical extension leads, in particular.

However, in some use situations, the stored article may be too heavy or cumbersome to be easily carried on the storage device to a site for use. In such situations an alternative embodiment may include or be adapted to include motive means in conjunction with the supporting means. For example, the supporting means may be a frame with wheels, tracks, castors, rollers or the like to facilitate movement of the attached storage device and stored article thereon. As may be appreciated, any number and arrangement of the motive means may be employed. In addition, there may be included braking means, and/or means that enable the frame with the storage device to be stood independently of the user.

In some embodiments the backbone of the storage device may be an integral part of the frame, as may the latching means. However, the storage device may be configured such that the device and the frame are two separate components and the backbone of the storage device may be configured hollow to slide over a central vertical tubular portion of the frame to enable the storage device to rotate as previously described.

For greater flexibility of storage and/or use, the frame may include a portion which is extendable telescopically. This telescopic extension may be part of the frame to which only he storage device is attached, or may involve a whole section of the frame being able to be extended telescopically. Appropriate catches, locking means and release systems may be employed to maintain the frame in its extended position and vice versa. Such an option may be beneficial where the storage device is being used to store and transport sheet materials and the like. The vertical portion of the frame also minimises the need for the user to have to bend to remove or apply the article to the storage device.

The frame may also include a form of handle to enable the frame with the storage device attached to or incorporated therein to be readily pushed or pulled in the direction required. Alternatively, the handle may be integral with the storage device.

In any embodiment the desire is for the storage device to be easy to operate, transport, or store and to require minimum time and physical requirements on the part of the user. Therefore, as can be appreciated variations to and from the above described embodiments may be made without deviating from the scope of the present invention.

For example, the body of the storage device may take any shape, provided the channel enables the article to be arranged as preferred therein. The storage device may also include the option of having adjustable insert(s) or blades inside or externally of the channel which are not only adjustable but can also clamp the article so it will not fall out.

The channel may also take clip-on attachments to adjust the length of the channel, such as an extrusion snap locked addition, that extends the length of the channel. Alternatively, there may be multiple channels, such as two channels side by side parallel to each other with the channels disjointed at the front or back, that can also be pulled in at the top to apply tension on the article at all times, or may also be adjustable.

The body and tine interrelationship may also include an adjustment means to adjust the channel width dimensions.

As previously described, the channel may have an undulating internal configuration on one or both of the internal surfaces which will contact the article. Alternatively, the arrangement may be a more angular zig-zag configuration. Whilst it may be even top to bottom it may also be pulled in at the top to apply tension on the article at all times, thereby maintaining a secure arrangement. The invention lends itself to any shaped channel arranged at any angle to the backbone as long as the article can be inserted into the channel as required, and for electrical leads especially, that the lead coils are arranged on top or to either side of each other in a substantially adjacent arrangement rather than having a doubling up of the lead.

Further the invention may include the use of a wall mounting bracket shaped to hold the handle of the storage device, or be configured to actually clip to the body. Further, the bracket may be stationary or may include a portion capable of co-operating with the body of the storage device to enable the bracket potion to slide up and down, or to slide up and out, or to pivot with relative to either the structure to which the bracket is attached, or the body of the storage device.

In addition, another embodiment may include a handle that is configured to slide up and down the backbone of the storage device. With this arrangement, the handle contributes to the positioning of the body in its optimal orientation for feeding out the article (being a hose, electrical lead, chain or rope). Effectively, as the handle is slid down the body, the body is able to pivot from a substantially vertical orientation through 90° to 180°. Alternatively, the handle may be fixed by being molded into the backbone of the storage device. The handle may of course take any suitable shape, including a hook or a circular shape. Yet a further alternative arrangement may include the handle at the bottom of storage device.

In addition to the handle, there may also be ancillary hooking means which enables the storage device to be hung from doorways, ledges or the like, where the handle can not be used to support the device.

The storage device may include tension means, such as springs, to facilitate operation from or recovery of the storage device in its upright position following pivoting of the storage device with respect to a mounting bracket. The storage device may also include repetitive backbone/tine configuration in adjacent proximity to each other and each capable of pivoting down as required. This is particularly relevant for versions of the storage device designed to accommodate heavy or cumbersome articles, such a hoses and the like.

As can be appreciated from the above description, the feature of the adjustments to the storage device obtained through the numerous alternative positions of more than one tine relative to more than one central backbone(s) of the present invention and the option to extend the length of the tines, to enable the backbone to rotate and/or at least the tine to pivot, provides some benefit over prior art systems which usually have a fixed capacity or mode of operation. The present invention also lends itself to use with a range of articles, which existing systems do not typically offer.

It should therefore further be appreciated a variety of different embodiments, uses, and applications of the present invention exist, even within the ambit of the above described storage system.

Various embodiments of the present invention, with and without motive means, will now be given by way of example only, to help better describe and define the present invention and possible variations thereto. However, describing only these specific embodiment should not be seen as limiting the scope of this invention.

BRIEF DESCRIPTION OF DRAWINGS

Further aspects of the present invention will become apparent from the following description, given by way of example only and with reference to the accompanying drawings in which:

FIG. 2a-c are a top plan view, a side view and a back plan view of the storage device of FIG. 1 in accordance with that preferred embodiment of the present invention; FIG. 5a-c are a top plan view, a side view and an front plan view of the storage device of FIG. 4 in accordance with that preferred embodiment of the present invention; FIG. 8 is a side view of the storage device in accordance with another preferred embodiment of the present invention; and FIG. 9 is a side view of the storage device in accordance with another preferred embodiment of the present invention; and FIG. 10 is a side view of the storage device in accordance with another preferred embodiment of the present invention; and FIG. 11 is a side view of the storage device in accordance with another preferred embodiment of the present invention.

BEST MODES FOR CARRYING OUT THE INVENTION

With reference to the diagrams (FIGS. 1 to 23) by way of example only, there is provided a storage device (generally indicated by arrow (1)). Whilst the storage device is described and referenced for use with electrical extension leads, it should be appreciated this invention may have application outside of this field.

Figure 1:
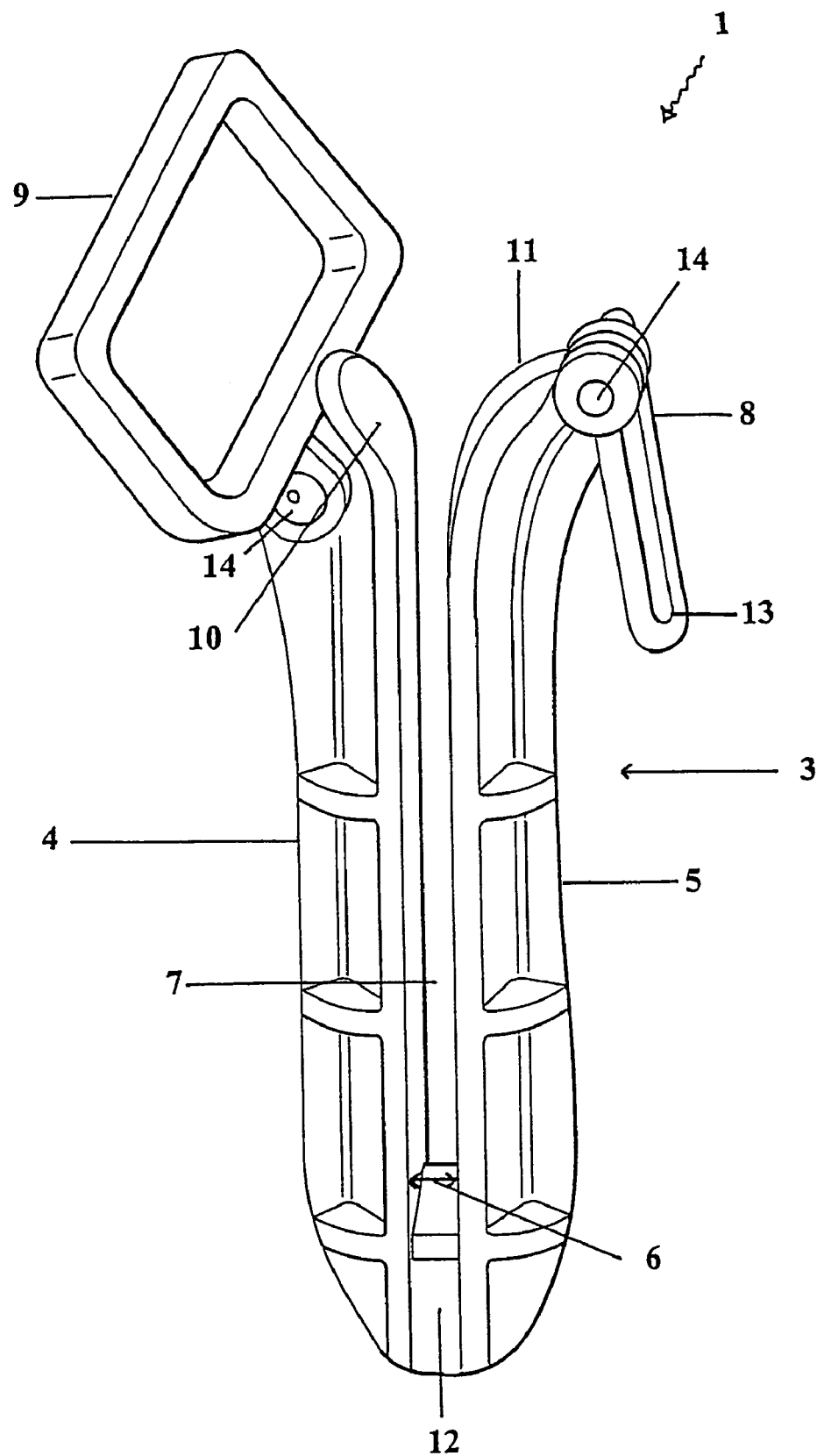
FIG. 1 is a front perspective view of the storage device in accordance with one preferred embodiment of the present invention.
Figure 3:
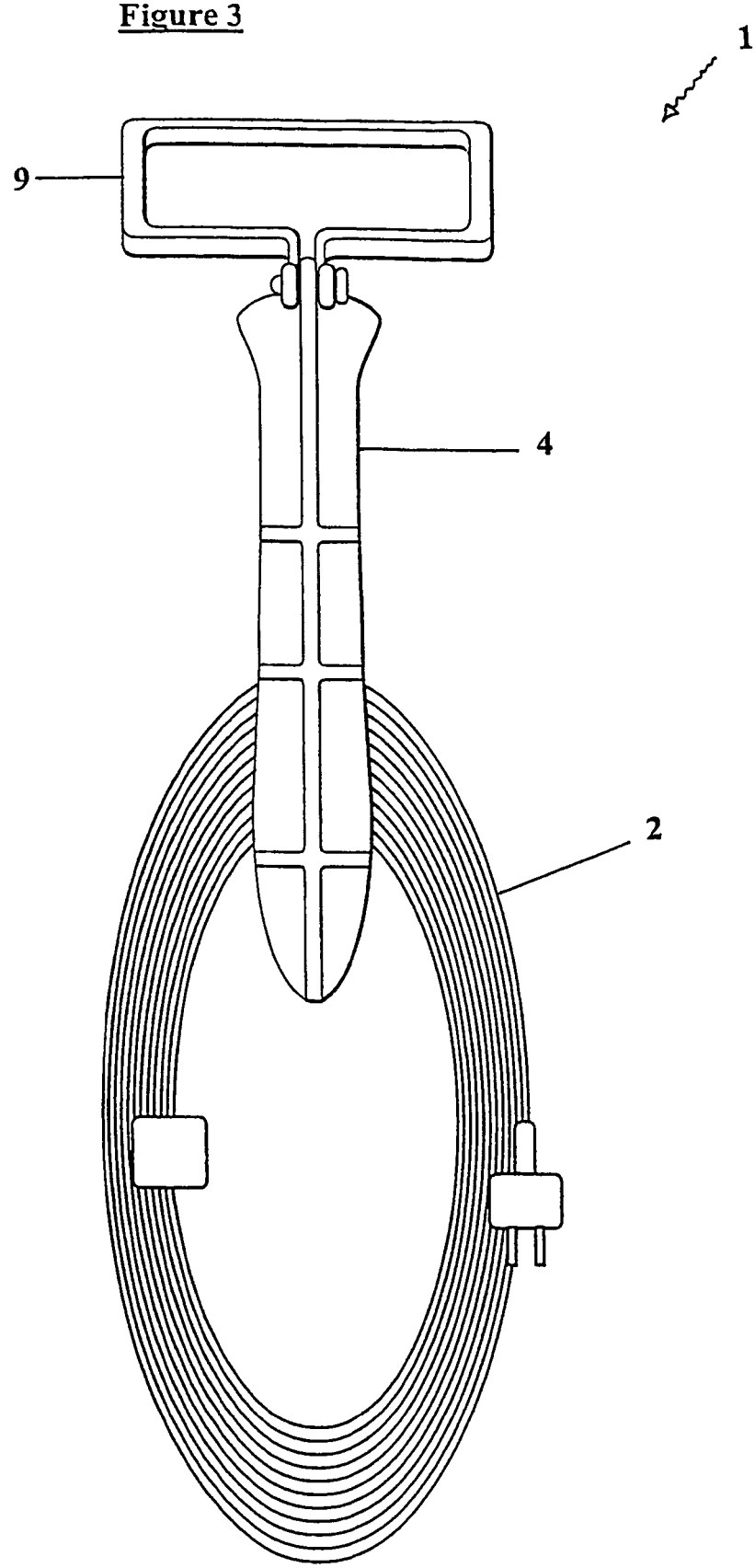
FIG. 3 is a back plan view of the storage device of FIGS. 1 and 2 showing an electrical extension lead stored by the storage device, in accordance with that preferred embodiment of the present invention.

Accordingly, FIGS. 1 to 3 illustrate one preferred embodiment of the present invention, where the storage device 1 is configured to store at least one lead 2.

The storage device includes a body 3, which includes a substantially elongate backbone 4 and at least one substantially elongate tine 5 interconnected thereto in a substantially parallel arrangement, but separated therefrom by a defined distance 6 to form a substantially uniform U-shaped channel 7. The back bone 4 and tine 5 may take any dimensions and shape, as can be seen in the various figures, as appropriate to the embodiment and purpose for which it is to be used. In some embodiments, such as in FIGS. 10 and 17, where multiple channels are included, the tine of a prior adjacent channel in effect operates as, or supports, the backbone of the next channel.

The storage device also includes latching apparatus 8 to maintain, as possible, the defined distance 6 between the backbone 4 and the tine 5 during storage of a lead 2 by the storage device 1.

The storage device 1 also optionally includes a handle 9, whether fixedly (as exampled in FIGS. 9 and 10) or removably (as exampled in FIG. 14) attached to the backbone, tine or interconnecting portion between the backbone and tine (as exampled in FIG. 11). In addition, the handle may pivot (as exampled in FIGS. 1, 6, 8, and 15) slide, or be fixed (as exampled in FIGS. 9 to 11); or be adapted to operate both as a pivoting and slidable handle (as exampled in FIGS. 13 and 14).

In the figures, particularly as illustrated in FIGS. 1 to 6, the elongate backbone 4 and the tine 5 of the body both include a free top distal end 10, and 11 respectively, whilst the bottom distal end provides an interconnecting portion 12 to form a channel 7.

The channel 7 formed between the backbone 4 and the tine 5 may be substantially U-shaped. The channel 7 between the backbone 4 and the tine 5 is a defined distance 6, which is defined by the diameter, or width of the lead 2, such that only one width of the lead is fed down the channel 7 at any one time.

Accordingly, subsequent looping of the lead 2 enables further widths of the lead to be fed down the channel 7 such that with each subsequent loop the section of lead within the channel 7 sits atop an adjacent previous looped section of the lead 2 as shown in FIG. 3. The electrical lead stored on the storage device of the present invention is preferably loosely looped with each successive loop only touching a portion of a loop of the lead directly above and/or below it.

Figures 6A, 6B:
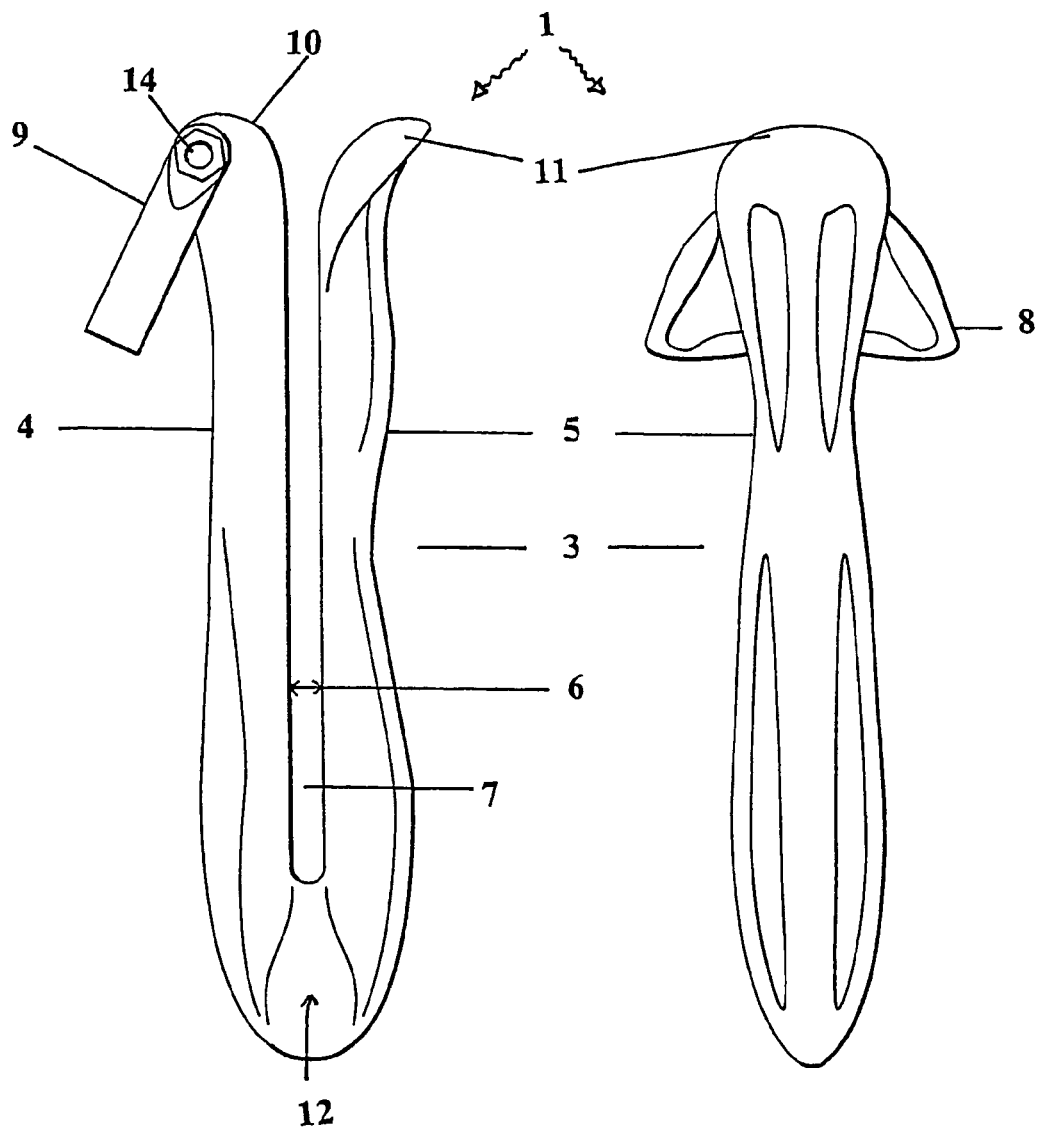
FIG. 6a, b are a side view and a front plan view of the storage device in accordance with a further preferred embodiment of the present invention.

The latching apparatus 8 is preferably pivotally attached to a portion of the body of the storage device and is able to operate between a latched position as illustrated in FIGS. 2a, 2b and 6b an unlatched position, as illustrated in FIGS. 1 and 6a. When in an unlatched position the lead 2 may be fed onto the storage device. When in the latched position removal of the lead is limited, or the lead and device are ready to be stored away.

The latching apparatus 8 is attached towards the top distal end 10 or 11 of either the backbone 4 or the tine 5, respectively. A loop portion 13 of the latching apparatus 8 is capable of looping over the top distal end of the tine, or backbone portion, to which the latching apparatus 8 is not attached. The dimensions of the loop 13 of the latching apparatus 8 are preferably defined to both accommodate the width of the backbone 4, or tine 5, as relevant, yet also include allowance for the width of the channel 7. In operation, the latching apparatus 8 maintains the defined distance 6 between the backbone 4 and the tine 5 during storage of a lead 2 by the storage device, via preventing the weight of the lead 2 stored within the channel 7 forcing the backbone 4 and tine 5 to splay apart from each other. The latching apparatus 8 also serves to secure the lead 2 on the storage device 1 and minimises the likelihood of the lead unwinding from the storage device.

In some embodiments, the latching apparatus 8 may also be used as a handle 9 for gripping the storage device in use, or for hanging the storage device when being stored, or, a handle 9 may operate as the latching apparatus 8. Such an alternative is illustrated in FIGS. 6a and 6b.

In order to operate as required either or both the latching apparatus 8 and/or the handle 9 are pivotable with respect to the backbone 4 or the tine 5 to which they are attached. Therefore, the latching apparatus 8 includes at least one aperture capable of alignment with a complementary aperture on a tine 5 or the backbone 4. A pivoting means 14, such as a pin and spring clip, a cotter pin, a rivet, a nut and bolt arrangement, or comparable available means may be used. Thus when the pivoting means 14 is engaged with the in-line apertures, the latching apparatus 8 is fitted to the body 3 of the storage device.

It is important to effect firm interconnection which allows appropriate pivoting, but not so much as to enable sloppy movement of the latching apparatus 8 relative to the backbone 4, or tine 5, which may negatively impact on the appropriate latching required, as well as resulting in wear around the internal surface of the apertures which may necessitate replacement of the latching apparatus 8, or pivoting means 14.

The same affixing, pivoting and operational description is also relevant to the storage device in the instance where an embodiment also, or instead, includes a handle 9, as illustrated in FIGS. 1 and 6a. Where embodiments do include a specifically designated handle 9, the handle 9 enables the storage device to be gripped to loop the lead on or off the device, enables the device to be carried to locations where the lead is required to be used and also provides a means to hang the storage device up for storage of either or both the storage device and the lead. The handle 9 of some embodiments may include specifically designed finger grooves, or similar as illustrated in the handles 9 of embodiments illustrated by FIGS. 5c and 6b, to improve the comfort of gripping the handle 9.

Figure 4:
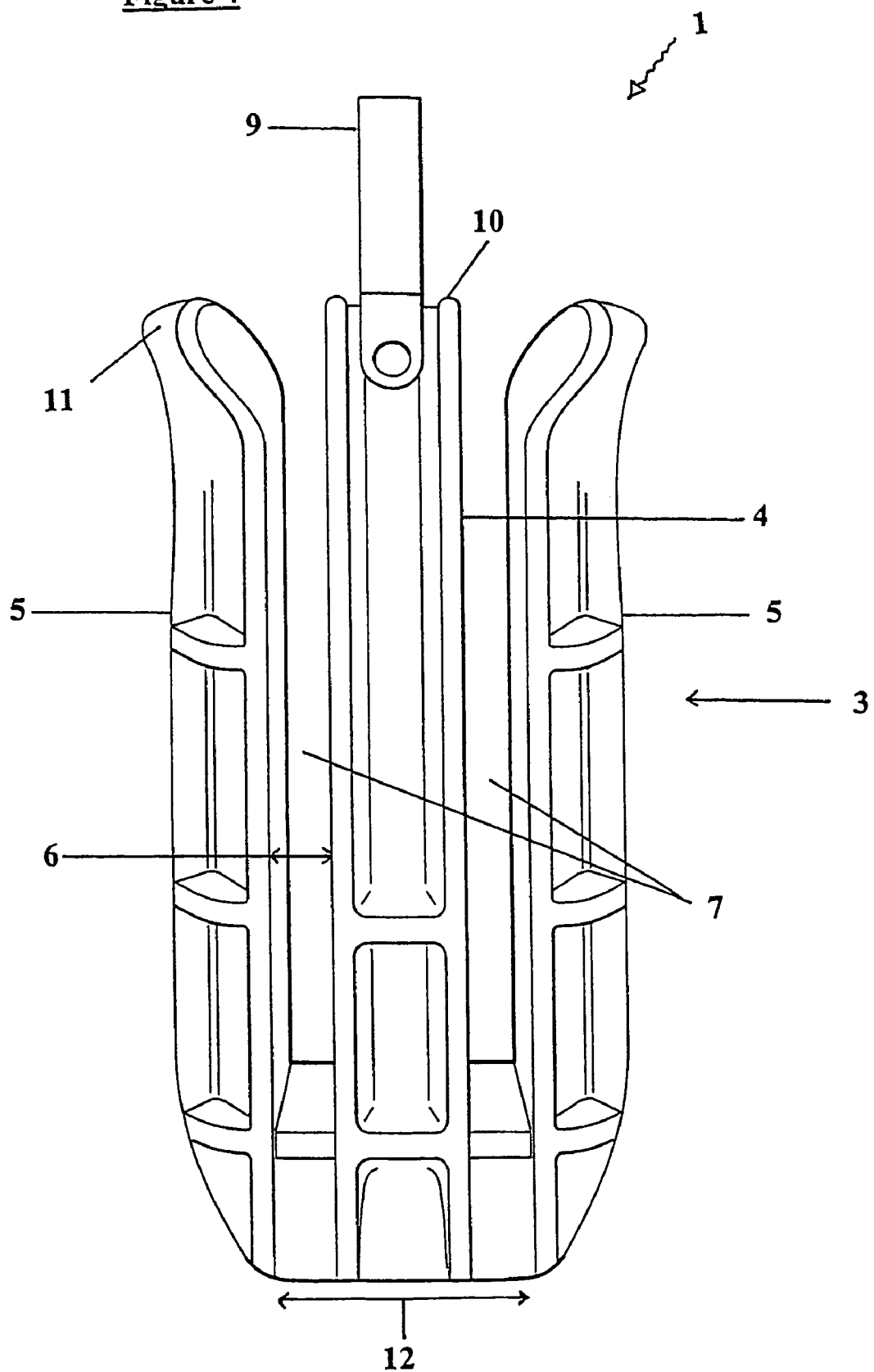
FIG. 4 is a side front perspective view of the storage device in accordance with a further preferred embodiment of the present invention in which two tines are included.
Figure 17:
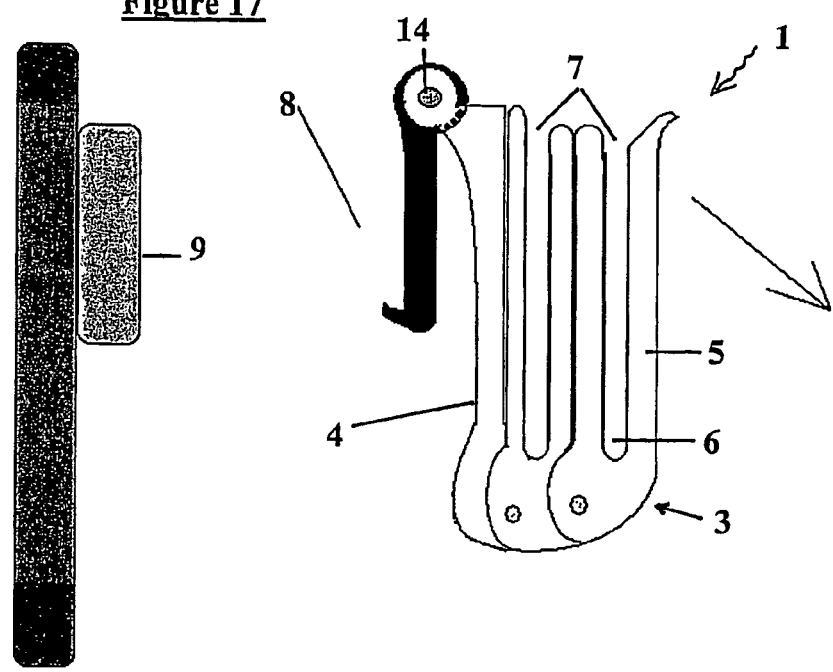
FIG. 17 is a side view of the storage device in accordance with another preferred embodiment of the present invention.
Figure 18:
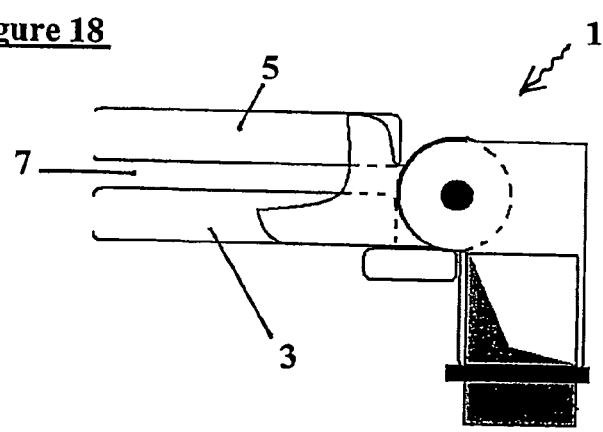
FIG. 18 is a side view of the storage device in accordance with another preferred embodiment of the present invention.

FIGS. 4 to 5c along with FIGS. 10 and 17, illustrate further embodiments of the storage device where additional tines 5 and/or backbones may be included, to accommodate separate leads 2 or leads of increased length which can not be accommodated within the channel 7 of a single tine version of the storage device. The number and arrangement of the tines relative to one or more central backbone(s) will thus determine the desired variability in the length of lead able to be stored on the storage device, or the number of separate leads able to be stored. This embodiment of the present invention provides a method of varying the lead storage capacity of the storage device for storing leads.

Where additional tines are included, the additional tines are arranged relative to the central backbone(s) so as to create a relatively seamless extension to the storage capacity of the overall combined structure. FIGS. 4 to 5c illustrate an embodiment of the present invention where two tines are located on opposite sides of the central backbone but all are aligned in the same plane. In yet other embodiments which have not been illustrated, the storage device may be configured to have the tines set to protrude from the central backbone with a defined angle of up to 90 degrees between the adjacent tines. In FIG. 10, the tines are angled away from the backbone to facilitate unwinding of the lead, etc from the tines during use.

With a single tine version of the invention as illustrated in FIG. 1 to 3, the body of the storage device 1 is designed to complement the type and length of the lead 2 required to be stored thereon. Accordingly, the length of the backbone 4 and the length of the tine 5 is determined to accommodate a preferred number of loops of the lead 2 stacked sequentially on top of each other as the lead is looped on to the storage device 1. In the illustrated embodiments the storage device is represented with a backbone 4 and tine 5 of fixed length.

Figure 19:
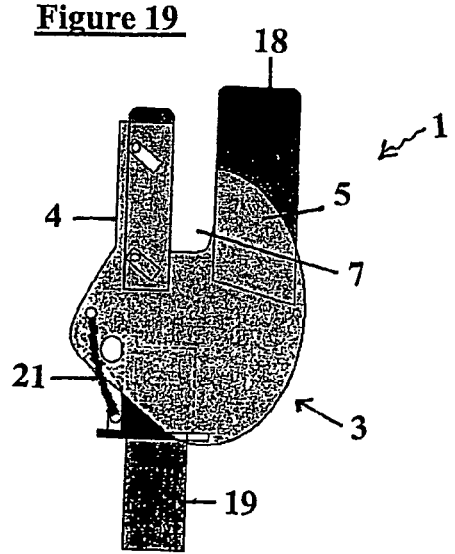
FIG. 19 is a side view of the storage device in accordance with another preferred embodiment of the present invention.

However, in some embodiments which are partially illustrated in FIG. 19, increased capacity of storage may be effected with a body 3 in which for example, the length of the tine 5 and/or backbone, may be extendable, such as via telescopically or via the use of extensions 16 which may be added to the tine 5 to provide the desired adjustability. Any such adjustment is preferably not time intensive, would not require complex additional pieces of machinery, specialist knowledge, or tools and would offer an effective adjustment means.

Whilst the storage device may be configured to take any appropriate shape as required to effect the preferred strength to support the weight of the lead, it is the defined distance 6 of the U-shaped channel 7 created between the backbone 4 and the tine 5 that is of most importance. Depending on the dimensions of the lead stored on the storage device, the width 6 of the channel 7 may vary from one embodiment to another. However, it is important that the channel be the defined width 6 for at least a substantial length of the channel receiving the lead(s).

The storage device 1 provides a system which is easy to operate, transport, or store and requires minimum time and physical requirements on the part of the user. It also provides a system whereby stored chords, flexes, hoses or leads 2 are stored in a manner that, when required to be used, are removal from the device 1 without a resulting tangled mess common to prior art system, as a result of the lead being sequentially stacked one loop at a time on top of the adjacent loop below it. Accordingly, when it comes to unlooping the lead, it does not have the opportunity to become tangled up with other loops on the storage device. The handle means of the storage device enables the device to be carried throughout the unlooping process, to further assist with placement of the lead as and where required. Finally, the present invention offers a safe alternative to the storage and use of electrical extension leads, in particular.

It should be appreciated that the above description mostly relates to the embodiments illustrated in FIGS. 1 to 6b. However, describing these embodiment only, should not be seen as limiting the scope of this invention, nor does it limit variations to and from the above described embodiments which may be made without deviating from the scope of the present invention.

Figure 7A:
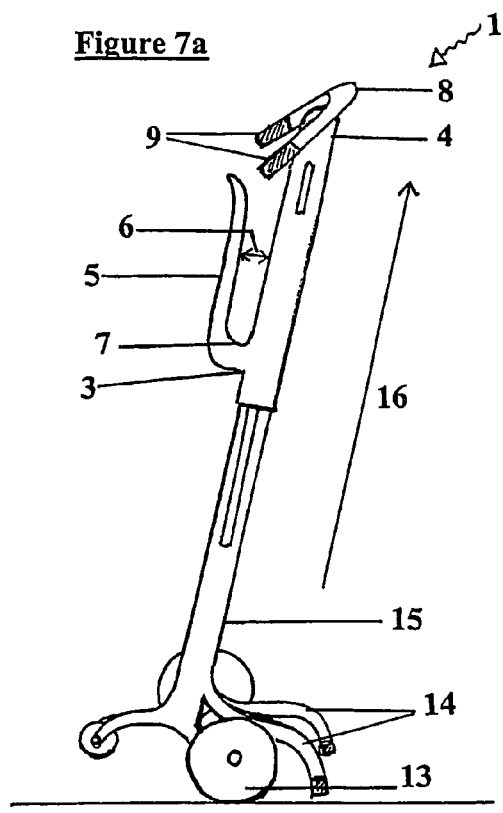
FIG. 7a-c is a side view, rear view and front view of the storage device with frame and motion facilitating apparatus in accordance with another preferred embodiment of the present invention.
Figure 7B:
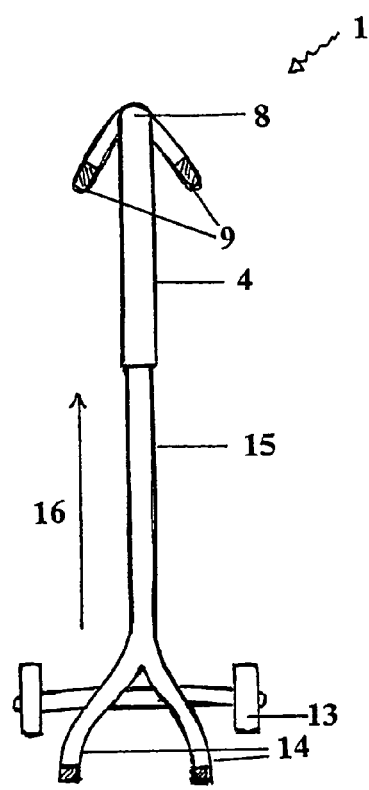
Figure 7C:
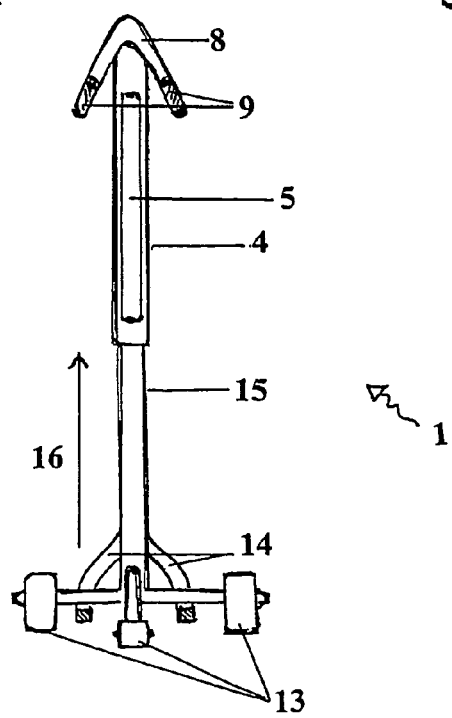

Accordingly, FIGS. 7a to 7c also illustrate another preferred embodiment of the present invention, where the storage device 1 is configured to store at least one lead 2. The storage device includes a body 3, which includes a substantially elongate backbone 4 and at least one substantially elongate tine 5 interconnected thereto in a substantially parallel arrangement, but separated therefrom by a defined distance 6 to form a channel 7. The channel in this embodiment is substantially uniform and U-shaped.

The storage device also includes latching apparatus 8 to maintain the defined distance 6 between the backbone 4 and the tine 5 during storage of a lead 2 by the storage device 1. The latching apparatus 8 is attached towards the top distal end 10 of the backbone 4.

The latching apparatus of this embodiment is also configured to provide handle means 9. In order to operate as required either or both the latching apparatus 8 (and the handle means 9) are pivotable with respect to the backbone 4.

With a single tine version of the invention as illustrated in FIG. 7a to 7c, the body of the storage device 1 is designed to complement the type and length of the lead 2 required to be stored thereon. Accordingly, the length of the backbone 4 and the length of the tine 5 is determined to accommodate a preferred number of loops of the lead 2 stacked sequentially on top of each other as the lead is looped on to the storage device 1. In the illustrated embodiments the storage device is represented with a backbone 4 and tine 5 of fixed length.

However, in some embodiments which are not illustrated, increased capacity of storage may be effected with a body 3 in which for example the backbone 4 is substantially longer than the tine 5, but the length of the tine 5 may be extendable, such as via telescopically or via the use of extensions which may be added to the tine 5 to provide the desired adjustability. Any such adjustment is preferably not time intensive, would not require complex additional pieces of machinery, specialist knowledge, or tools and would offer an effective adjustment means.

Whilst the storage device may be configured to take any appropriate shape as required to effect the preferred strength to support the weight of the lead, it is the defined distance 6 of the channel 7 created between the backbone 4 and the tine 5 that is of most importance. Depending on the dimensions of the lead or other article stored on the storage device, the width 6 of the channel 7 may vary from one embodiment to another. However, it is important that the channel be the same defined width 6 for the substantial length of the channel receiving the lead(s).

In some use situations, the stored article may be too heavy or cumbersome to be easily carried on the storage device to a site for use. In such situations the described embodiment is configured to include or be adapted to include motive means 13, such as wheels or castors to facilitate movement of the storage device and stored article thereon. As may be appreciated, any number and arrangement of the motive means may be employed. In addition, there may be included braking means, or bracing means 14 that enable the storage device to be stood independently of the user.

Therefore in such instances a stand or a frame 15 may be included on to which the motive means 13 with or without braking means or bracing means 14 may be included. In some embodiments the backbone of the storage device may be an integral part of the frame 15, as may the latching means. However, the storage device may be configured such that the device and the frame are two separate components and the backbone of the storage device may be configured hollow to slide over a central vertical tubular portion of the frame to enable the storage device to rotate as previously described.

For greater flexibility of storage and/or use, the frame may include a portion which is extendable telescopically 16. This telescopic extension may be part of the frame to which only the storage device is attached, or may involve a whole section of the frame being able to be extended telescopically. Appropriate catches, locking means and release systems may be employed to maintain the frame in its extended position and vice versa. Such an option may be beneficial where the storage device is being used to store and transport sheet materials and the like. The vertical portion of the frame also minimises the need for the user to have to bend to remove or apply the article to the storage device.

The storage device 1 provides a system which is easy to operate, transport, or store and requires minimum time and physical requirements on the part of the user. It also provides a system whereby stored cords, flexes, hoses or leads 2 or other articles may be stored in a manner that, when required to be used, are removed from the device 1 without a resulting difficulty, or length of time. The handle means of the storage device enables the device to be stabilised or carried throughout the unloading process, to further assist with placement of the article as and where required. Finally, the present invention offers a safe alternative to the storage and use of electrical extension leads, in particular.

It should be appreciated that the above description relates to the embodiments illustrated in FIGS. 7a to 7c. However, describing these embodiment only, should not be seen as limiting the scope of this invention, nor does it limit variations to and from the above described embodiments which may be made without deviating from the scope of the present invention.

For example, the body of the storage device may take any shape, as illustrated in FIGS. 8 through 21 provided the channel enables the article to be arranged as preferred therein. The storage device may also include the option of having adjustable insert(s) or blades inside or externally of the channel (not shown) which are not only adjustable but can also clamp the article so it will not fall out. The channel may also take clip-on attachments to adjust the length of the channel, such as an extrusion snap locked addition, that extends the length of the channel. Alternatively, there may be multiple channels, such as two channels side by side parallel to each other (as in FIGS. 10 and 17). The backbone and the tine(s) may be interconnected in a jointed arrangement, such as in FIGS. 15, 16 20 and 21, that may also be adjustable.

Figure 14A:
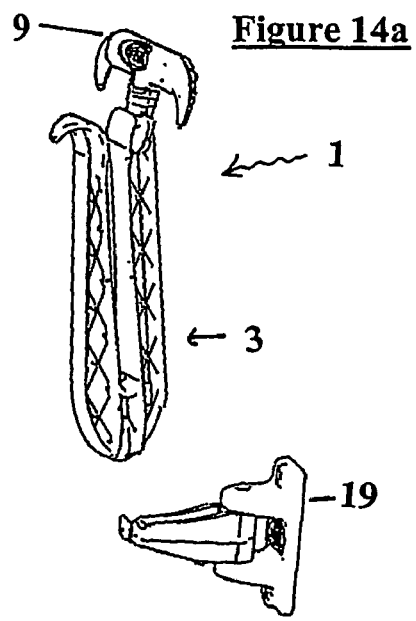
FIG. 14a-c are perspective and side views of the storage device in accordance with another preferred embodiment of the present invention.
Figure 14B:
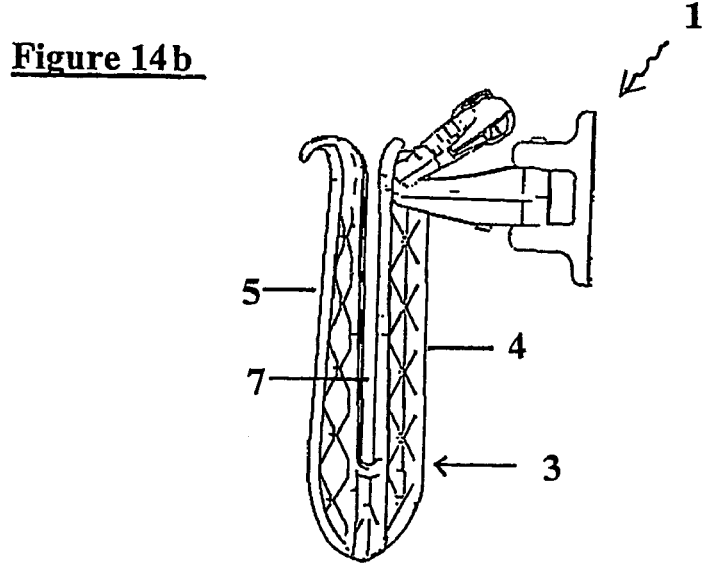
Figure 14C:
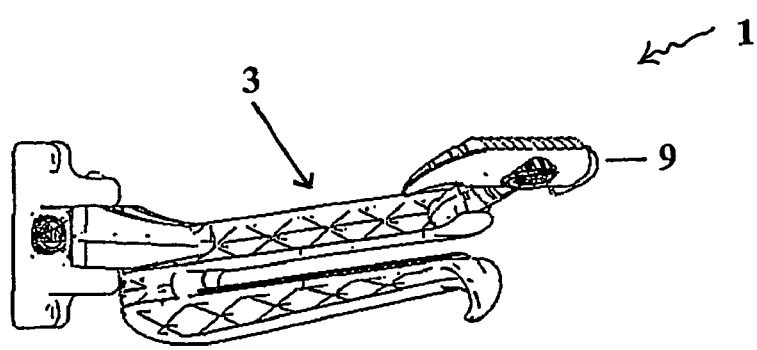
Figure 15:
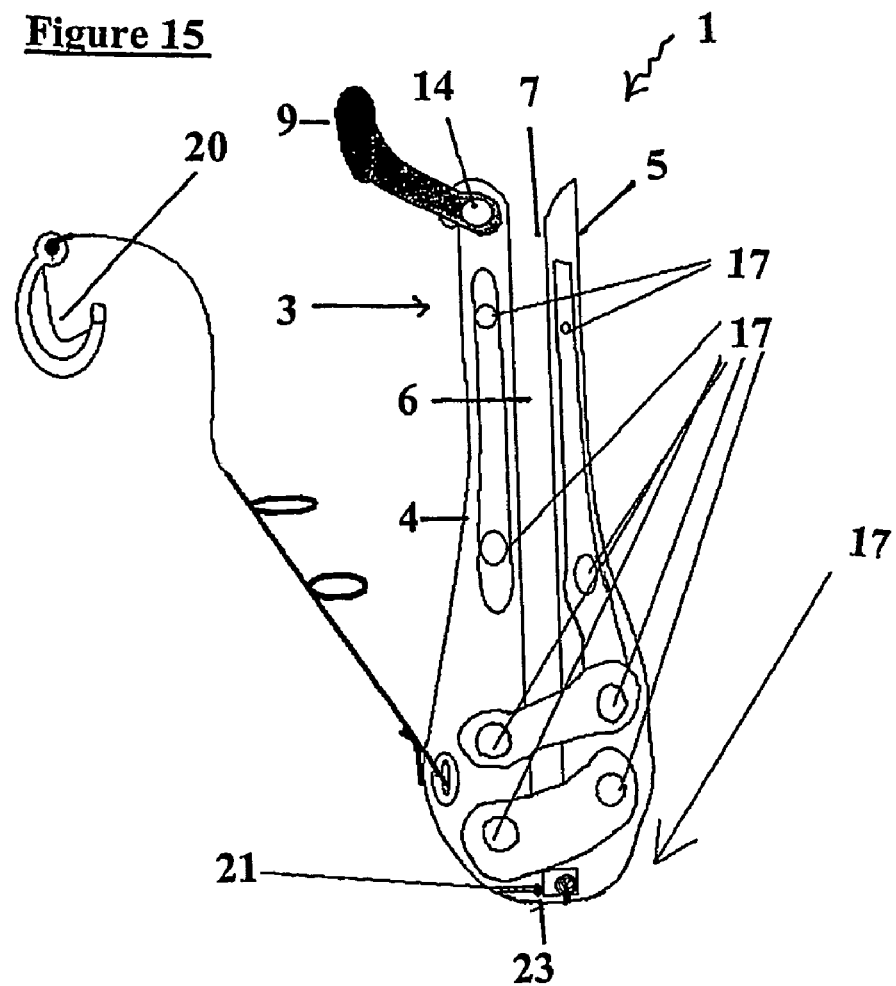
FIG. 15 is a side view of the storage device in accordance with another preferred embodiment of the present invention.
Figure 16:
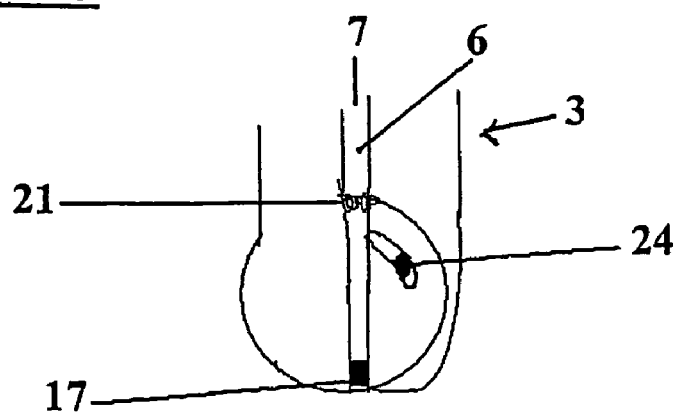
FIG. 16 is a side view of the storage device in accordance with another preferred embodiment of the present invention.
Figure 20:
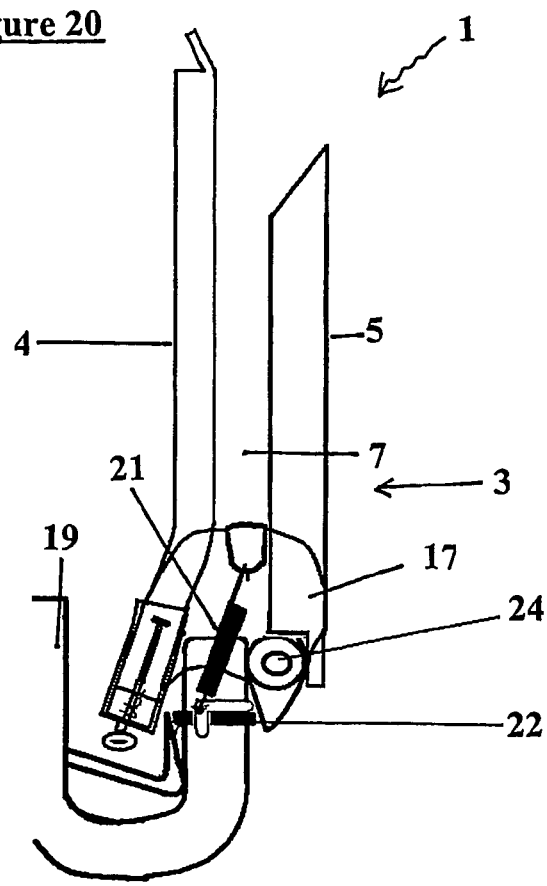
FIG. 20 is a side view of the storage device in accordance with another preferred embodiment of the present invention.
Figure 21:
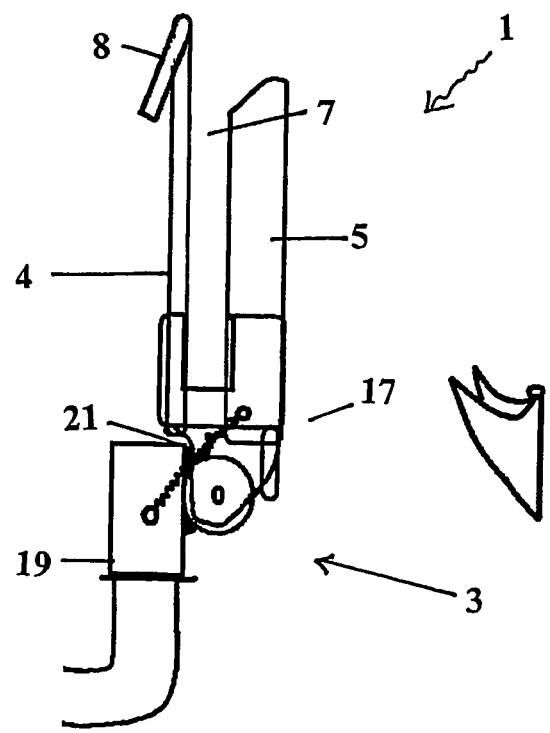
FIG. 21 is a side view of the storage device in accordance with another preferred embodiment of the present invention.
Figure 22:
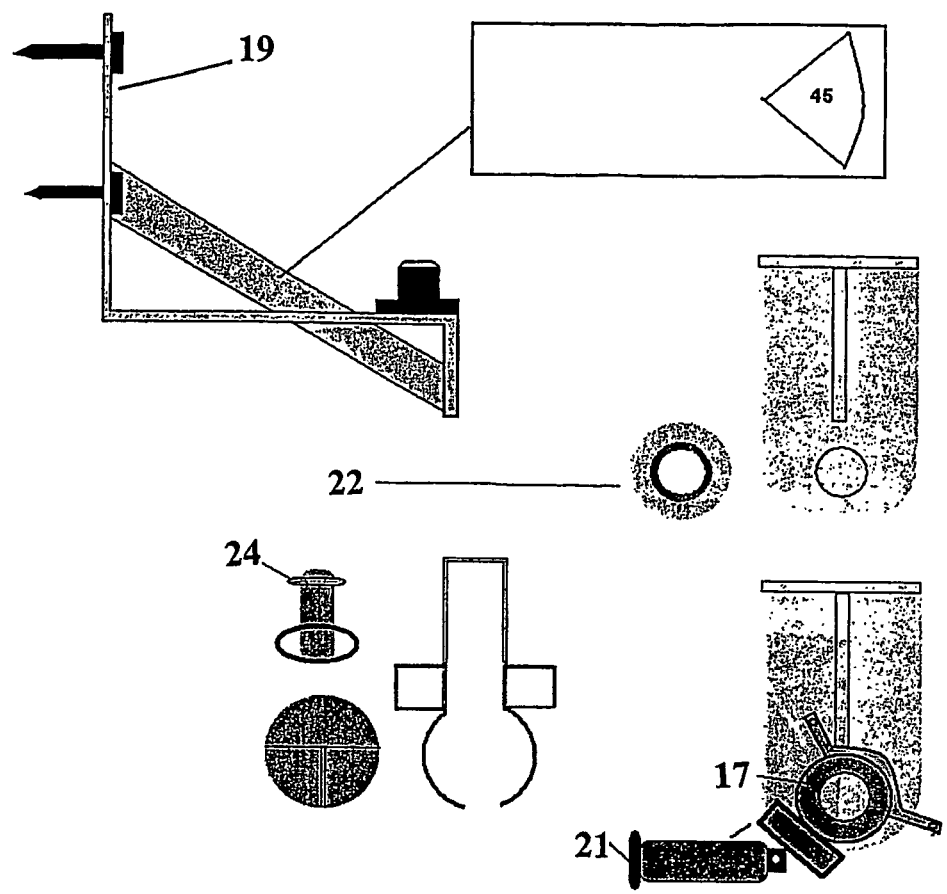
FIG. 22 is a side view of a support bracket for the storage device along with the component parts of the base of the pivoting mechanism for the storage device, in accordance with another preferred embodiment of the present invention.
Figure 23:
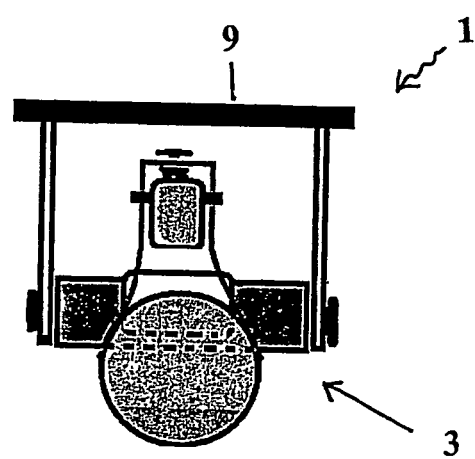
FIG. 23 is a view of the storage device in accordance with another preferred embodiment of the present invention.

The adjustment means 17 as shown in FIGS. 15 and 16, to adjust the channel width dimensions; and/or as shown in FIGS. 20 and 21, may also facilitate pivoting of the storage device with respect to a support bracket 19, which may be affixed to a supporting surface, such as a wall, post and so forth. The wall mounting bracket may be shaped to hold the handle of the storage device, or be configured to actually clip to the body as in FIG. 14. Further, the bracket may be stationary or may include a portion capable of co-operating with the body of the storage device to enable the bracket potion to slide up and down and out (as in FIGS. 12 and 14), or to pivot relative to either the structure to which the bracket is attached, or the body of the storage device (as in FIGS. 18-21). The bracket may also include a pivoting portion 25 as shown particularly in FIGS. 12 and 14, enabling the storage device to swing through a horizontal plane. This feature facilitates feeding out of the lead, hoes, rope, etc towards whatever direction is required.

Figure 12:
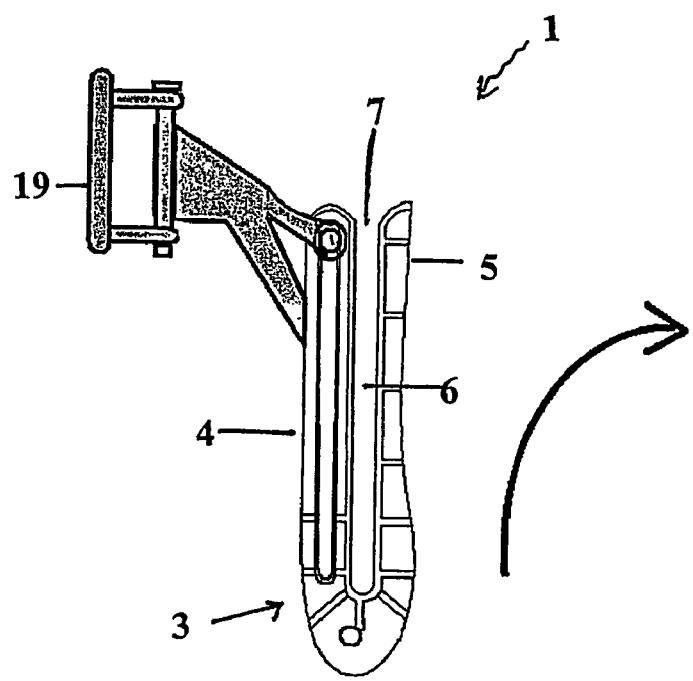
FIG. 12 is a side view of the storage device in accordance with another preferred embodiment of the present invention.
Figure 13:
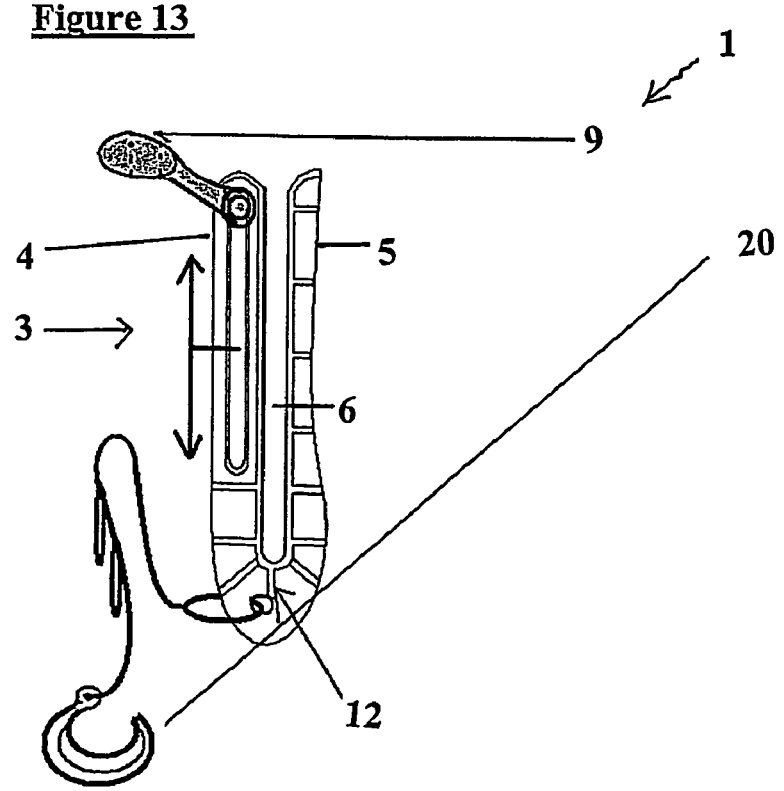
FIG. 13 is a side view of the storage device in accordance with another preferred embodiment of the present invention.

In addition, as in FIGS. 13 and 14, the handle is also configured to slide up and down the backbone of the storage device. With this arrangement, the handle contributes to the positioning of the body in its optimal orientation for feeding out the article (being a hose, electrical lead, chain or rope). Effectively, as the handle is slid down the body, the body is able to pivot from a substantially vertical orientation through 90° to 180°, in the same manner as illustrated in FIG. 12. The handle may of course take any suitable shape, including a hook or a circular shape.

In addition to the handle, there may also be ancillary hooking means 20 which enables the storage device to be hung from doorways, ledges or the like, where the handle can not be used to support the device.

The storage device may include tension means, such as springs 21, to facilitate operation from or recovery of the storage device in its upright position following pivoting of the storage device with respect to a mounting bracket. The storage device may also include repetitive backbone/tine configuration in adjacent proximity to each other and each capable of pivoting down as required. A range of bushes 22, ball-bearing arrangements 23 and pivot pins 24, may also be included to facilitate a smooth pivoting or rotating motions.

As previously described, the channel may have an undulating internal configuration on one or both of the internal surfaces which will contact the article. Alternatively, the arrangement may be a more angular zig-zag configuration. Whilst it may be even top to bottom it may also be pulled in at the top to apply tension on the article at all times, thereby maintaining a secure arrangement. The invention lends itself to any shaped channel arranged at any angle to the backbone as long as the article can be inserted into the channel as required, and for electrical leads especially, that the lead coils are arranged on top or to either side of each other in a substantially adjacent arrangement rather than having a doubling up of the lead.

It should also be understood that the term "comprise" where used herein is not to be considered to be used in a limiting sense. Accordingly, 'comprise' does not represent nor define an exclusive set of items, but includes the possibility of other components and items being added to the list.

This specification is also based on the understanding of the inventor regarding the prior art. The prior art description should not be regarded as being an authoritative disclosure of the true state of the prior art but rather as referring to considerations in and brought to the mind and attention of the inventor when developing this invention.

Aspects of the present invention have been described by way of example only and it should be appreciated that modifications and additions may be made thereto without departing from the scope thereof, as defined in the appended claims.

The claims defining the invention are:

1. A storage device for use with at least one article, said storage device including:

a body, said body including at least one substantially elongate backbone and at least one substantially elongate tine interconnected thereto but separated therefrom by a defined distance to form a channel adapted to receive one width at a time of the article positioned therein, and supporting means attachable to said body, said supporting means including a handle pivotally attached to said body and moveable in relation thereto enabling the storage device to pivot between a substantially vertical orientation to a substantially horizontal orientation as required to enable the object to be received within the channel and removed from the channel, respectively as required.

2. A storage device as claimed in claim 1 wherein the storage device optionally includes latching apparatus capable of co-operating with either or both the backbone and the tine, to maintain the defined distance between the backbone and the tine during storage of a article by the storage device.

3. A storage device for storing at least one article as claimed in claim 2 wherein the elongate backbone and the tine of the body both include a free top distal end to create an opening for insertion of the article there between.

4. A storage device for storing at least one article as claimed in claim 3 wherein the elongate backbone and the tine of the body include a bottom distal end which are interconnected to form the channel.

5. A storage device for storing at least one article as claimed in claim 4 wherein the width of the channel formed between the backbone and the tine is defined by the diameter, or width, of at least one article to be stored in the device.

6. A storage device for storing at least one article as claimed in claim 5 wherein the width of the channel is determined to enable only one width of the article to be fed down the channel at any one time.

7. A storage device for storing at least one article as claimed in claim 5 wherein where the article is a lead, subsequent looping of the lead enables further widths of the lead to be fed down the channel such that, with each subsequent loop, the section of lead within the channel sits substantially atop an adjacent previous looped section of the lead.

8. A storage device for use with at least one article as claimed in claim 5 wherein the channel is substantially uniform along its length.

9. A storage device for use with at least one article as claimed in claim 8 wherein the channel is substantially U-shaped.

10. A storage device for use with at least one article claim 5 wherein the channel is substantially non-linear and/or non-uniform along its length.

11. A storage device as claimed in claim 5 wherein the interconnected backbone and tine are adjustably connected to enable the dimensions of the channel to be adjusted relative to the dimensions of the article being stored in the storage device.

12. A storage device as claimed in claim 4 wherein the interconnected backbone and tine are pivotally connected to enable the tine to pivot down relative to the backbone for fast release of the article from the storage device.

13. A storage device as claimed in claim 12 wherein the storage device includes tension means associated with the pivoting portions of the supporting means, the body, and/or the tine, to facilitate return of the storage device to its storage configuration following release of the article from the storage device.

14. A storage device for storing at least one article as claimed in claim 2 wherein the latching apparatus contributes to maintaining the defined distance between the backbone and the tine during storage of the article by the storage device, by preventing the weight of the article stored within the channel from forcing the backbone and the tine to splay apart from each other.

15. A storage device for storing articles as claimed in claim 14 wherein the latching apparatus is attached towards the top distal end of either the backbone, or the tine.

16. A storage device for storing articles as claimed in claim 15 wherein where the latching apparatus is attached towards the top distal end of the backbone, a portion of the latching apparatus is capable of looping over the top distal end of the tine, or vice versa.

17. A storage device for storing at least one article as claimed in claim 16 wherein the latching apparatus may be used as, or adapted to include, a handle for gripping the storage device in use, or for hanging the storage device when being stored.

18. A storage device for storing at least one article as claimed in claim 17 wherein a portion of either or both the latching apparatus and the supporting means is adapted to rotate.

19. A storage device for storing at least one article as claimed in claim 18 wherein the latching apparatus and/or the supporting means are adapted to rotate up to 360°.

20. A storage device for storing at least one article as claimed in claim 19 wherein rotation of the latching apparatus enables the latching apparatus to be moved to latch adjacent tines in embodiments where multiple tines are included.

21. A storage device for storing at least one article as claimed in claim 19 wherein rotation of the supporting means enables the backbone and tine to be rotated in any direction to release the article, specifically where the article is a lead, hose, or rope.

22. A storage device for storing at least one article as claimed in claim 16 wherein a portion of either or both the latching apparatus and the supporting means is adapted to pivot.

23. A storage device for storing at least one article as claimed in claim 22 wherein the portion of the latching apparatus and/or of the supporting means are adapted to pivot through an arc of up to 360°.

24. A storage device for storing at least one article as claimed in claim 23 wherein pivoting of the latching apparatus enables the latching apparatus to move between an opened orientation to a closed orientation relative to the backbone and tine.

25. A storage device for storing at least one article as claimed in claim 23 wherein pivoting of a portion of the supporting means enables the backbone and tine supported thereby, to operate between a storage position and a releasing position relative to the article stored therein.

26. A storage device for use with at least one article, as claimed in claim 1 wherein the article may include a lead, cord, rope, chain, solid sheet or elongate material.

27. A storage device for storing at least one article as claimed in claim 26 wherein the storage device is configured to store, carry or use the article within or relative to the storage device.

28. A storage device for storing at least one article as claimed in claim 1, wherein the supporting means includes at least one of a bracket and a frame.

29. A storage device for storing at least one article as claimed in claim 28 wherein the handle is configured for gripping the storage device in use, or for hanging the storage device when being stored, or is operable as the latching apparatus.

30. A storage device as claimed in claim 28 wherein where the supporting means includes a frame, the frame is adapted to receive optional motive means to facilitate transport of the storage device and included article to and from an area for use.

31. A storage device as claimed in claim 28 wherein where the supporting means includes a bracket, one or more brackets are adapted to be affixed to support surfaces for receiving and/or relocating the body of the storage device and included article to and from an area for use.

32. A storage device as claimed in claim 1 wherein the backbone is adapted to slide relative to the supporting means to enable the body of the storage device to be moved from a storage position up and out through at least a 90° arc to a release position for fast release of the article from the storage device.

33. A storage device as claimed in claim 1 wherein the tines are adapted to receive either or both additional, longer, or extendable tines removably or permanently attached to the backbone or in association with existing tines to accommodate articles of increased length.

34. A storage device as claimed in claim 1 wherein additional backbones may be included from which at least one tine may extend.

35. A method of manufacturing a storage device for storing at least one article, said storage device including a body, said body including at least one substantially elongate backbone and at least one substantially elongate tine interconnected thereto but separated therefrom by a defined distance to form a channel adapted to receive one width at a time of the article positioned therein, and a supporting means attachable to said body, said supporting means including at least handle means pivotally attached to said body and moveable in relation thereto enabling the storage device to pivot between a substantially vertical orientation to a substantially horizontal orientation as required to enable the object to be received within the channel and removed from the channel, respectively as required; and said method including the steps of:
a) manufacturing a substantially elongate backbone, which includes or is adapted to receive at least one substantially elongate tine, said at least one tine being spaced apart from said backbone by a distance defined by a width of the article to be stored therewith to create a channel for receiving the article, said backbone and at least one tine forming the body of the storage device; and
b) attaching supporting means to the body of the storage device, said supporting means including at least a handle and being moveable along said backbone to enable said body to pivot relative thereto enabling the object to be received within the channel and removed from the channel, respectively as required.

36. A method of varying an article storage capacity of a storage device for storing either or both leads and substantially solid sheet materials, said storage device including a body, said body including a substantially elongate backbone and multiple substantially elongate tines interconnected to said backbone, each said tine being separated from the backbone by a defined distance to form a channel adapted to conform to the width of the article positioned therein, each said tine also being further separated from each other by a defined distance, said storage device further including supporting means attachable to said backbone of the body and moveable in relation thereto enabling the storage device to pivot between a substantially vertical orientation to a substantially horizontal orientation as required to enable the object to be received within the channel and removed from the channel, respectively as required, said method including the steps of:

adapting an existing backbone to receive two or more tines;

connecting the tines to the backbone such that the tines are separated from each other and from the backbone by defined distances;

ensuring the channels created therebetween each tine and the backbone is capable of receiving the article; and increasing the number of tines relative to the backbone thereby increasing the article storage capacity of the storage device.

* * * * *